(12) United States Patent
Thomas et al.

(10) Patent No.: US 11,640,236 B2
(45) Date of Patent: May 2, 2023

(54) VISUAL FORM DESIGNER

(71) Applicant: Oracle International Corporation, Redwood Shores, CA (US)

(72) Inventors: George Thomas, San Ramon, CA (US); Yue Zhou, Dublin, CA (US); Laurensius Lie, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/542,210

(22) Filed: Aug. 15, 2019

(65) Prior Publication Data

US 2019/0369857 A1 Dec. 5, 2019

Related U.S. Application Data

(62) Division of application No. 15/203,670, filed on Jul. 6, 2016, now abandoned.
(Continued)

(51) Int. Cl.
*G06F 3/04847* (2022.01)
*G06F 3/04842* (2022.01)
(Continued)

(52) U.S. Cl.
CPC ........ *G06F 3/04847* (2013.01); *G06F 3/0482* (2013.01); *G06F 3/04817* (2013.01); *G06F 3/04842* (2013.01); *G06F 8/38* (2013.01)

(58) Field of Classification Search
CPC ............. G06F 3/04847; G06F 3/04817; G06F 3/0482; G06F 3/04842; G06F 8/38
See application file for complete search history.

(56) References Cited

U.S. PATENT DOCUMENTS 5,920,866 A * 7/1999 Crim .................... G06F 16/217
6,014,138 A 1/2000 Cain et al.
(Continued)

OTHER PUBLICATIONS

Cognito Forms, "Create online surveys, order forms, registration forms and more," available at https://www.cognitoforms.com/ (accessed May 24, 2016).
(Continued)

*Primary Examiner* — Kavita Stanley
*Assistant Examiner* — William Wong
(74) *Attorney, Agent, or Firm* — Invoke

(57) ABSTRACT

A visual form designer is disclosed. A target user interface is configured to display a particular form. A design user interface is used to design the target user interface. The design user interface includes at least a widget-selection section and a form-design section. The design user interface also includes various layout options for displaying a form template in the form-design section. An interface widget may be dragged from the widget-selection section to a particular location in the form template in the form-design section. The design user interface displays an instance of the interface widget at the particular location in the form template. A different layout may be selected. The design user interface displays the instance of the interface widget at a different location in the form template in the different layout. Hence, instances of interface widgets in the form template are rearranged based on a selected layout option.

21 Claims, 19 Drawing Sheets

Related U.S. Application Data

(60) Provisional application No. 62/245,991, filed on Oct. 24, 2015.

(51) Int. Cl.
*G06F 3/0482* (2013.01)
*G06F 3/04817* (2022.01)
*G06F 8/38* (2018.01)

(56) References Cited

U.S. PATENT DOCUMENTS

| | | | |
|---|---|---|---|
| 6,968,503 | B1 | 11/2005 | Chang et al. |
| 7,168,035 | B1* | 1/2007 | Bell .................. G06F 40/143 |
| | | | 715/745 |
| 7,496,837 | B1 | 2/2009 | Larcheveque et al. |
| 8,625,769 | B1* | 1/2014 | Allen .................. G06F 16/24 |
| | | | 379/203.01 |
| 8,832,027 | B1* | 9/2014 | Bushman ............ G06F 11/1451 |
| | | | 707/639 |
| 9,130,832 | B1* | 9/2015 | Boe .................... G06F 16/24 |
| 2002/0082953 | A1 | 6/2002 | Batham et al. |
| 2003/0145276 | A1 | 7/2003 | Hirata |
| 2004/0075682 | A1 | 4/2004 | Burleson |
| 2005/0138216 | A1 | 6/2005 | Giles |
| 2005/0141026 | A1* | 6/2005 | Fujino ................ H04N 1/0022 |
| | | | 358/1.15 |
| 2005/0172264 | A1 | 8/2005 | Yuknewicz et al. |
| 2005/0273573 | A1* | 12/2005 | Liu .................... G06F 16/86 |
| | | | 711/206 |
| 2005/0278307 | A1* | 12/2005 | Battagin ............... G06F 16/25 |
| 2006/0242302 | A1* | 10/2006 | Walker ................ G06Q 10/06 |
| | | | 709/227 |
| 2006/0294137 | A1 | 12/2006 | Bryant et al. |
| 2008/0140694 | A1* | 6/2008 | Mangla ................ G06F 16/258 |
| 2010/0095351 | A1 | 4/2010 | Liu et al. |
| 2012/0117121 | A1* | 5/2012 | Thomas ................ G06F 16/25 |
| | | | 707/796 |
| 2012/0290959 | A1* | 11/2012 | Quine .................. G06F 3/048 |
| | | | 715/765 |
| 2013/0073939 | A1* | 3/2013 | Honsowetz ........... G06F 40/18 |
| | | | 715/212 |
| 2014/0122497 | A1 | 5/2014 | Eigner et al. |
| 2014/0222445 | A1 | 8/2014 | Bischoff et al. |
| 2014/0372860 | A1 | 12/2014 | Craven et al. |
| 2016/0364398 | A1* | 12/2016 | Nelson ................ G06F 40/106 |
| 2017/0286495 | A1* | 10/2017 | Ott .................... G06F 16/22 |

OTHER PUBLICATIONS

Cognito Forms, "Features," available at https://www.cognitoforms.com/features (accessed May 24, 2016).

Cognito Forms, "Starting from Scratch," available at https://www.cognitoforms.com/starting-from-scratch (accessed May 24, 2016).

Google, "Google Forms," available at https://www.google.com/forms/about/ (accessed May 24, 2016).

Jotform, "Online Form Builder," available at http://www.jotform.com/ (accessed May 24, 2016).

\* cited by examiner

Screenshot 506

| Cancel | Lookup | |
|---|---|---|
| Search f... Prompt Record | | |
| ▲ Search Criteria | | |
| ▼ Search Results | | |
| Record (Table) Name ◇ | | Record Description ◇ |
| COUNTRY_TBL | Data Sources 552 | Countries |
| DEPT_ALL_VW | | View of all Departments |
| PYMT_TRMS_CNTL | | Payment Terms Control |
| STATE_TBL | | States and Provinces |

4 rows

FIG. 5D

| Screenshot 508 | | | |
|---|---|---|---|
| Cancel | | Lookup | |
| Search f... Department | | | |
| ▶ Search Criteria | | | |
| ▼ Search Results | | | |
| | | | 173 rows |

Data Fields 553

| Department ◇ | Description ◇ | Manager Name ◇ |
|---|---|---|
| 1 | Department 1 | |
| 10000 | Human Resources | Ball, Nancy |
| 101 | Human Resources | |
| 10200 | Headquarters | |
| 10500 | Benefits | Ford, Jane |
| 105000 | Benefits | Ford, Jane |
| 11000 | Information Services | Miller, Samuel |
| 12000 | Public Affairs | Miller, Samuel |
| 13000 | Finance | Bister, James |
| 13110 | Finance | |
| 13140 | Revenue Management | Patterson, John |
| 14000 | Administration | Zak, Jill |
| 15000 | Business Services | Ellis, Hugh |
| 2 | Department 2 | |

Entries 554

Screenshot 518

Design a New Form

Design Forms

*Form

My Forms

| Form ◇ | Status ◇ | | Effective Date To ◇ | |
|---|---|---|---|---|
| 1 CORPCARD | In Design | 10/15/2 | Edit | |
| 2 TUITION15 | Activated | 10/15/2 | Edit | |

2 rows

Add To Homepage — Button 562

Add to Homepage  ✕

Choose from available homepages

- Employee Self Service
- Learning Center
- My Homepage
- Update Manager Homepage
- Expenses Or create a new Homepage Add to new Homepage [Add]

FIG. 51

VISUAL FORM DESIGNER

INCORPORATION BY REFERENCE; DISCLAIMER

Each of the following applications are hereby incorporated by reference: application Ser. No. 15/203,670 filed on Jul. 6, 2016; application No. 62/245,991 filed on Oct. 24, 2015. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to designing an interface. In particular, the present disclosure relates to providing an application which can be used by a user to design an interface without the user programming the interface with a programming language.

BACKGROUND

A form provides a standardized format for submitting requests, orders, and/or other information. Different companies may use different forms for submitting different requests. As an example, Company A may offer reimbursement of tuition expenses for courses taken by employees. Company A may require identification of the course by course number. Company A may utilize a form, for submitting tuition reimbursement requests, that includes a field accepting the course number. Company B may also offer reimbursement of tuition expenses for courses taken by employees. Company B may require a textual description of the course. Company B may utilize a form, for submitting tuition reimbursement requests, that includes a field accepting the textual description of the course. As illustrated in this example, Company A and Company B use different forms for submitting tuition reimbursement requests.

A form includes various fields for accepting specific types of data. Different types of fields may be used, such as a textbox, a dropdown menu, a toggle button, and/or a checkbox. Different companies may design different forms, including different fields, for submitting requests.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-5I illustrate example screenshots of a design user interface for designing a particular form, in accordance with one or more embodiments;

DETAILED DESCRIPTION

Figure 1A:
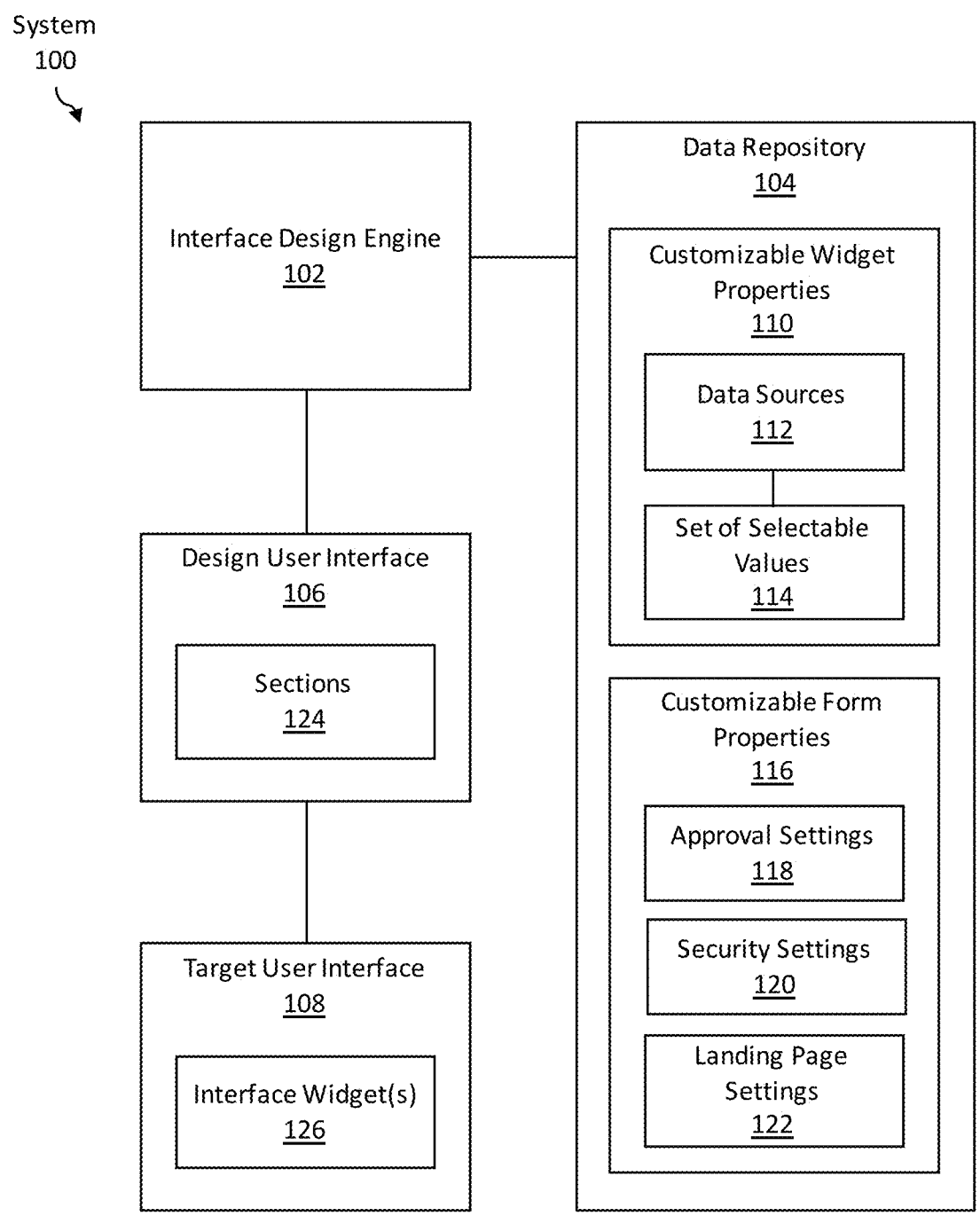
FIG. 1A illustrates an interface design system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INTERFACE DESIGN SYSTEM ARCHITECTURE
3. CONFIGURING A WIDGET PROPERTY FOR A PARTICULAR FORM
4. CONFIGURING A FORM PROPERTY FOR A PARTICULAR FORM
5. RECEIVING A REQUEST VIA A PARTICULAR FORM
6. EXAMPLE EMBODIMENTS
7. MISCELLANEOUS; EXTENSIONS
8. HARDWARE OVERVIEW

1. General Overview

One or more embodiments include a design user interface for designing a target user interface displaying a particular form. The particular form includes an instance of an interface widget that is integrated with an existing data source. The design user interface displays multiple existing data sources that may be associated with the instance of the interface widget. Each data source specifies a limited set of selectable values. A user designing the particular form may select one of the multiple existing data sources. The instance of the interface widget is configured to accept a value from the limited set of selectable values specified by the selected data source. The interface widget may be, for example, a dropdown menu that accepts a value from the limited set of selectable values.

One or more embodiments include a design user interface for designing a target user interface displaying a particular form. The particular form includes an instance of an interface widget that is associated with a particular destination. The particular destination is configured to store data submitted via the instance of the interface widget. The design user interface displays multiple destinations that may be configured to store data. A user designing the particular form may select one of the multiple destinations. Data submitted via the instance of the interface widget is stored at the selected destination. Data submitted via multiple instances of interface widgets may be stored at a same destination or different destinations. Data submitted via different forms may be stored at a same destination or different destinations.

One or more embodiments include a design user interface for specifying users and/or roles that are required for approving a request submitted via a particular form. The design user interface displays users and/or roles for selection. A user designing the particular form may select a sequence of users and/or roles for approving a request submitted via a particular form. Requests submitted via the particular form are transmitted to each user and/or role for approval.

One or more embodiments include a design user interface for specifying users and/or roles that have permissions for submitting a request via a particular form. The design user interface displays users and/or roles for selection. A user designing the particular form may select users and/or roles having permissions to the particular form. The particular form may be displayed to users and/or roles that are associated with the corresponding permissions. The particular form is not displayed to users and/or roles that are not associated with the corresponding permissions.

One or more embodiments include a design user interface for specifying a landing page configured to display an icon representing the particular form. The design user interface displays multiple landing pages for selection. Each landing page may be associated with a different group of end users. A user designing the particular form may select landing pages for displaying an icon representing the particular form. The selected landing pages are associated with the particular form. A particular landing page may be displayed for a particular end user. If the particular landing page is associated with the particular form, then the particular landing page displays an icon representing the particular form. The particular end user may select the icon to request display of the particular form.

In one or more embodiments, the design user interface is a graphical user interface (GUI) that includes multiple sections. A widget-selection section, a form-design section, and a widget-properties section are concurrently displayed. A user may design a form using the design user interface, without programming the target user interface using a programming language.

One or more embodiments described in this Specification and/or recited in the claims may not be included in this General Overview section.

2. Interface Design System Architecture

FIG. 1A illustrates an interface design system 100, in accordance with one or more embodiments. As illustrated in FIG. 1A, system 100 includes an interface design engine 102, a data repository 104, a design user interface 106, and a target user interface 108. In one or more embodiments, system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, target user interface 108 is configured to display a form used by an end user. A form provides a standardized format for submitting requests, orders, and/or other information. A form may be used to submit, for example, a tuition reimbursement request, a vacation request, a food order, a performance review, and/or a complaint. An end user may be, for example, an employee of a particular company who wishes to submit a request, order, and/or other information.

Target user interface 108 includes a graphical user interface (GUI). A GUI enables communication and/or interaction between a system and a user using visual user interface elements. Target user interface 108 may optionally also include a command line interface (CLI), a haptic interface, and a voice command interface.

Target user interface 108 includes one or more interface widgets 126 that are displayed by the GUI. An interface widget 126 is a user interface element or field for accepting data. Examples of interface widgets 126 include a textbox, a dropdown menu, a toggle button, a date selector, a number field, and/or a checkbox.

In one or more embodiments, design user interface 106 is configured to design a form. Design user interface 106 includes a GUI. A user may design target user interface 108 using design user interface 106, without programming target user interface 108 using a programming language. A user may configure an interface widget 125 of target user interface 108 using design user interface 106, without using a programming language. Examples of programming languages include C, C++, Hypertext Markup Language (HTML), JAVASCRIPT, Extensible Markup Language (XML), XML User Interface Language (XUL), Cascading Style Sheets (CSS), and JAVA.

Design user interface 106 includes sections 124 displayed by the GUI. Multiple sections may be concurrently displayed. Each section 124 includes user interface elements associated with a particular topic and/or category.

Figure 1B:
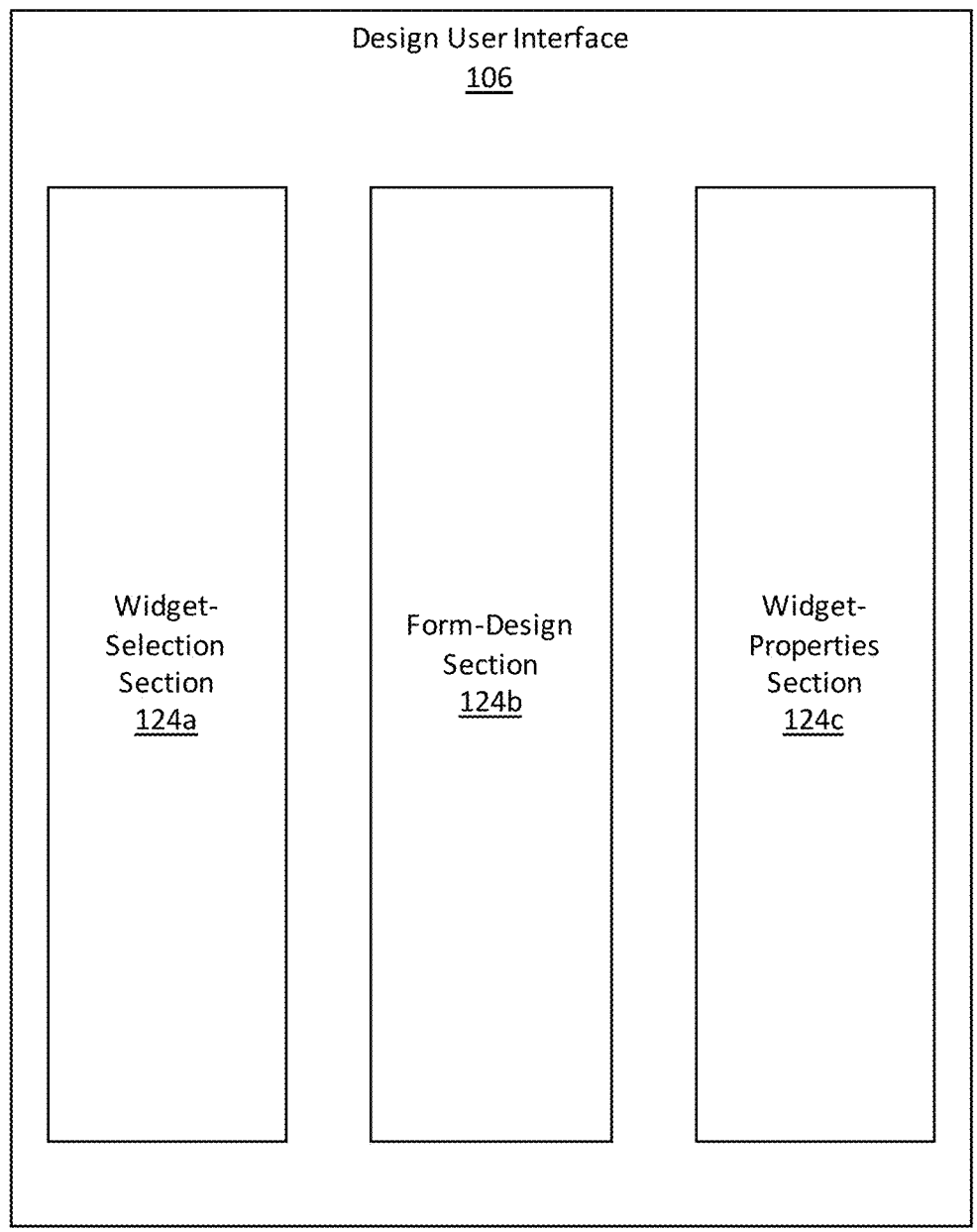
FIG. 1B illustrates an example of a design user interface, in accordance with one or more embodiments.

FIG. 1B illustrates an example of design user interface 106, in accordance with one or more embodiments. Design user interface 106 concurrently displays widget-selection section 124a, form-design section 124b, and widget-properties section 124c. Additional and/or alternative sections 124 may be used.

Widget-selection section 124a displays interface widgets 126 that are available for selection by a user designing target user interface 108. Form-design section 124b displays a form that is being designed. The form being designed may include interface widgets 126 that have been selected from the widget-selection section 124a. As an example, a user designing a form may drop and drop a particular interface widget from the widget-selection section to the form-design section. The location at which the particular interface widget is dropped is the location at which an instance of the particular interface widget will be displayed on the form.

Widget-properties section 124a displays customizable widget properties 110 associated with an interface widget 126. Further description relating to customizable widget properties 110 are included below.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as interface design engine 102. Alternatively or additionally, data repository 104 may be implemented or executed on a computing system separate from interface design engine 102. Data repository 104 may be communicatively coupled to interface design engine 102 via a direct connection or via a network.

Information describing customizable widget properties 110 and customizable form properties 116 may be implemented across any of components within system 100. However, this information is illustrated within data repository 104 for purposes of clarity and explanation.

In one or more embodiments, customizable widget property 110 is a property and/or characteristic of an interface widget 126 that is configurable by a user designing target user interface 108. Customizable widget property 110 may be a visual property of interface widget 126, such as a color of interface widget 126, and a size of interface widget 126. Additionally or alternatively, customizable widget property 110 may be metadata associated with interface widget 126. Metadata associated with interface widget 126 includes, for example, an identifier (ID) of interface widget 126, a flag indicating whether interface widget 126 is a required field of a form, a type of interface widget 126, and a location on a particular form at which interface widget 126 is to be displayed.

One example of a customizable widget property 110 associated with an instance of a particular interface widget 126 is a set of selectable values 114. The particular interface widget 126 is configured to accept a value from the set of selectable values 114. The particular interface widget 126 may not accept any value that is not included in the set of selectable values 114. The particular interface widget 126 may be, for example, a dropdown menu that accepts a value from a set of selectable values 114.

The set of selectable values 114, associated with an instance of a particular interface widget 126, is specified by one of a plurality of existing data sources 112. As an example, a data source may include a set of values: United States, Canada, Mexico. An instance of a particular interface widget associated with the data source may accept a value from the set of values: United States, Canada, Mexico. The instance of the particular interface widget may not accept values other than: United States, Canada, Mexico.

Data source 112 is a database, record, log, table, list, and/or other structure configured to store data. Additionally or alternatively, data source 112 is a column, row, and/or cell of a database. In an embodiment, different data sources 112 may be different databases. In another embodiment, different data sources 112 may be different columns of a same database.

Data source 112 may be maintained by an application that is separate from interface design engine 102. As an example, a data source may include departments of a company. A particular application for managing a corporate organizational structure may be used to maintain the data source. The particular application may be separate from an application for designing a form. However, the application for designing a form has access to the data source.

Data source 112 may include information in addition to selectable values for an instance of an interface widget 126. The information stored by data source 112 may be organized according to a schema. The schema may include various data fields, one of which is configured to store selectable values for an instance of an interface widget 126.

As an example, a schema for a data source may include the following data fields: Department Name, and Department Head. A first entry may include: "Sales Department" under Department Name, and "John Smith" under Department Head. A second entry may include: "Engineering Department" under Department Name, and "Elizabeth Brown" under Department Head. A set of selectable values, for an instance of a particular interface widget, may be specified by the Department Name field of the data source. The set of selectable values may be: "Sales Department," "Engineering Department."

Another example of a customizable widget property 110 associated with an instance of a particular interface widget 126 is a destination for storing data submitted via the instance of the particular interface widget 126. A destination is a database, record, log, table, list, and/or other structure configured to store data. Additionally or alternatively, a destination is a column, row, and/or cell of a database. Data submitted via multiple instances of interface widgets may be stored at a same destination or different destinations. Data submitted via different forms may be stored at a same destination or different destinations.

In an embodiment, multiple instances of interface widgets may share a same destination. Instances of interface widgets of different forms may share a same destination.

As an example, a system may include multiple forms. "Tuition Reimbursement Form" may include the fields "Department" and "Tuition Amount." "Vacation Request Form" may include the fields "Start Date" and "Total Number of Days."

The multiple forms may share a particular table as a destination. Each entry of the particular table may correspond to different data submission made via one of the multiple forms.

A first column of the particular table may store a "Form Name" corresponding to a particular entry. The "Form Name" may be "Tuition Reimbursement Form" or "Vacation Request Form." A second column may correspond to the "Department" field of the "Tuition Reimbursement Form." A third column may correspond to the "Start Date" field of the "Vacation Request Form." A fourth column may correspond to both (a) the "Tuition Amount" field of the "Tuition Reimbursement Form" and (b) the "Total Number of Days" field of the "Vacation Request Form." As shown in this example, each column corresponds to one instance of an interface widget of a particular form. However, one column may correspond to multiple instances of a same or different interface widget across different forms.

Additional and/or alternative customizable widget properties 110 may be used.

In one or more embodiments, customizable form property 116 is a property and/or characteristic of a form displayed by target user interface 108. Customizable form property 116 is configurable by a user designing target user interface 108. Customizable form property 116 may be a visual property of the form, such as a title of the form. Additionally or alternatively, customizable form property 116 may be metadata associated with the form. Metadata associated with the form includes, for example, a form ID.

One example of a customizable form property 116 is approval settings 118. Approval settings 118 includes specification of a group of users and/or roles that are required for approving a request submitted via a particular form. A user may be identified based on a user ID. A role may be a position, title, and/or other categorization associated with one or more users. As an example, a role may be "Chief Executive Officer." As another example, a role may be "Any Member of the Sales Team."

Another example of a customizable form property 116 is security settings 120. Security settings 120 includes specification of a group of users and/or roles that have permissions to submit a request via a particular form. Users and/or roles outside of the security group may not submit a request via the particular form.

Another example of a customizable form property 116 is landing page settings 122. Landing page settings 122 includes specification of one or more landing pages for displaying an icon representing a particular form. A landing page is a user interface that is displayed to an end user by a particular application. An icon displayed by a landing page may be selected by an end user to display another user interface.

A particular application may be associated with various landing pages. Each landing page may be associated with a particular topic and/or category. A landing page displays various icons related to the particular topic and/or category. As an example, one landing page may be associated with "Timesheets." Another landing page may be associated "Benefits." The "Timesheets" landing page may include an icon for a particular form. The form may be used by an end user to submit time entries and request overtime pay. The "Benefits" landing page may include an icon for another form. The form may be used by an end user to claim health benefits.

Each landing page is associated with a group of end users. Different end users of the particular application have access to different landing pages. As an example, an application may be associated with multiple pages, including a particular landing page titled "Bob's Team." The particular landing page may include items that are useful for members of Bob's team. The particular landing page may be associated with the end users John Smith and Mary Jones. Various end users may utilize the application. Only John Smith and Mary Jones have access to the particular landing page. Other end users of the application do not have access to the particular landing page.

Alternatively, a landing page is associated with a particular set of roles. End users associated with at least one of the particular set of roles have access to the landing page. As an example, a "Timesheets" landing page may be associated with the role "Non-Exempt Employee." Non-exempt employees may be entitled to overtime pay and may be required to enter timesheets. Hence, an end user who is a "Non-Exempt Employee" may have access to the "Timesheet" landing page. An end user who is an "Exempt Employee" does not have access to the "Timesheet" landing page.

Additional and/or alternative customizable form properties 116 may be used.

In one or more embodiments, interface design engine 102 refers to hardware and/or software configured to perform operations described herein for designing target user interface 108 using design user interface 106. Examples of operations for designing target user interface 108 using design user interface 106 are described below with reference to FIGS. 2-3.

In an embodiment, interface design engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

3. Configuring a Widget Property for a Particular Form

Figure 2:
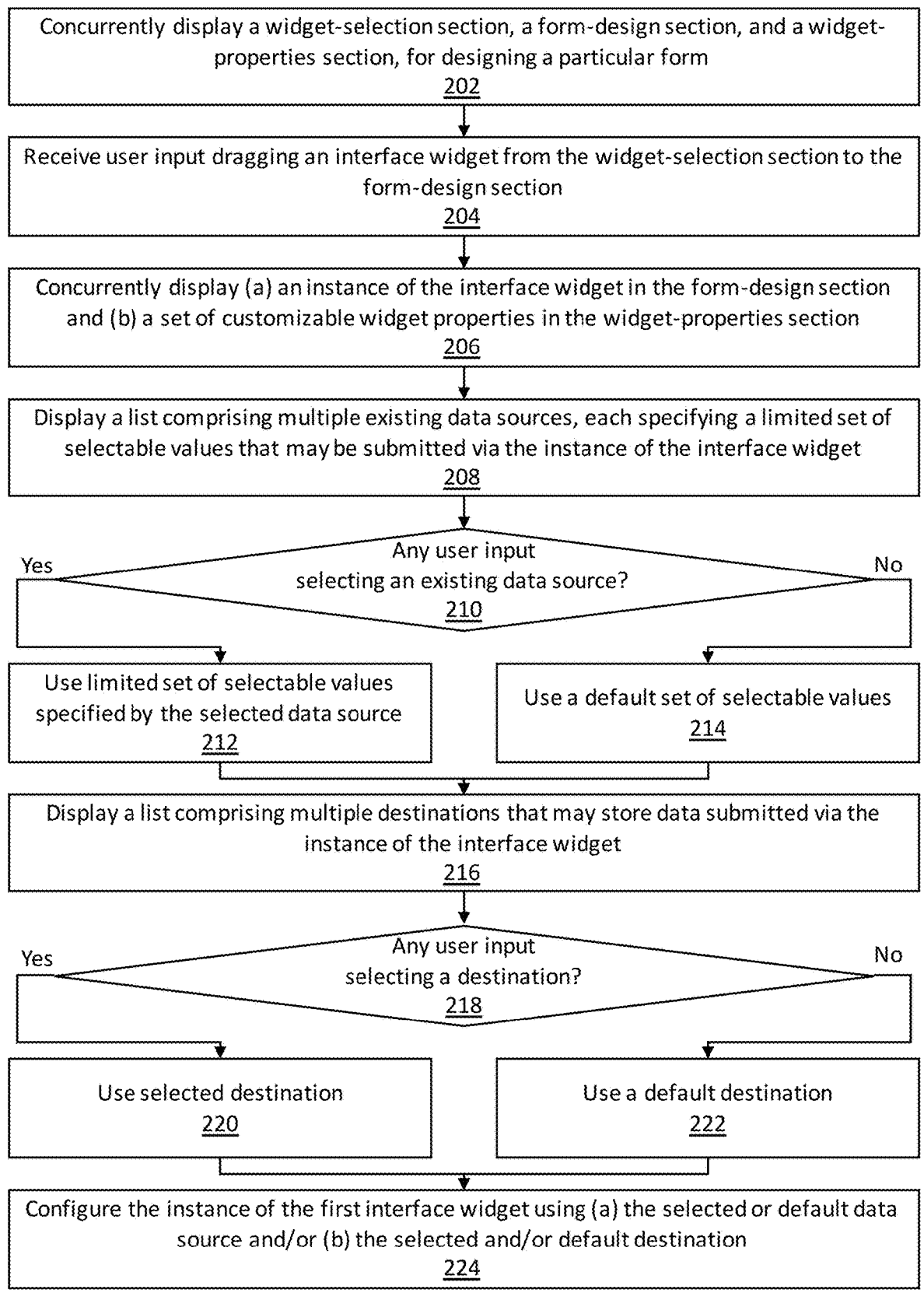
FIG. 2 illustrates an example set of operations for configuring a widget property for a particular form, in accordance with one or more embodiments.

FIG. 2 illustrates an example set of operations for configuring a widget property for a particular form, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include concurrently displaying a widget-selection section, a form-design section, and a widget-properties section, for designing a particular form (Operation 202). An interface design engine displays a design user interface. The design user interface includes concurrent display of the widget-selection section, the form-design section, and the widget-properties section. Concurrently displaying may include displaying the multiple sections side-by-side on a design user interface. Additionally or alternatively, concurrently displaying may include displaying the multiple sections overlapping with each other on a design user interface.

The interface design engine displays, in the widget-selection section, interface widgets that are available for selection. A user designing the particular form may select any of the interface widgets in the widget-selection section for inclusion in the particular form.

The interface design engine displays, in the form-design section, a form template that may be used to design the particular form. The form-design section may be configurable to present the form template in various dimensions. A form template having particular dimensions is suited for being displayed by devices having a particular form factor. As an example, a form-design section may include options for displaying the form template in various dimensions. One option may provide that the ratio of the width of the form template to the height of the form template is 16:9. This option may be suitable for laptops, which have screens associated with a form factor of 16:9. Another option may provide that the ratio of the width of the form template to the height of the form template is 1:2. This option may be suitable for smartphones, which have screens associated with a form factor of 1:2.

The interface design engine displays, in the widget-properties section, customizable widget properties of one or more instances of interface widgets that have been selected for inclusion in the particular form.

One or more embodiments include receiving user input dragging an interface widget from the widget-selection section to the form-design section (Operation 204). The interface design engine receives user input via the design user interface. The user input comprises dragging an interface widget from the widget-selection section and dropping the interface widget in the form-design section. The interface design engine may receive user input comprising dropping an interface widget at a particular location in the form template displayed in the form-design section.

One or more embodiments include concurrently displaying (a) an instance of the interface widget in the form-design section and (b) a set of customizable widget properties in the widget-properties section (Operation 206). The interface design engine generates and displays an instance of the interface widget. The interface design engine displays the instance of the interface widget at the particular location at which the interface widget was dropped in the form-design section.

Additionally, the interface design engine identifies a set of customizable widget properties associated with the interface widget. The interface design engine displays the set of customizable widget properties for the instance of the interface widget in the widget-properties section. The set of customizable widget properties may include: a label of the instance of the interface widget, a description of the instance of the interface widget, and/or an existing data source to be associated with the instance of the interface widget.

One or more embodiments include displaying a list comprising multiple existing data sources, each specifying a limited set of selectable values that may be submitted via the instance of the interface widget (Operation 208).

In an embodiment, the interface design engine obtains a list identifying existing data sources. The list is stored at a data repository of the interface design engine. The list identifies the data sources by referencing an address and/or identifier of the data sources. The interface design engine displays a list of the addresses and/or identifiers of the data sources.

In an additional or alternative embodiment, the interface design engine identifies existing data sources from a particular memory location. The interface design engine obtains information identifying the particular memory location from a data repository of the interface design engine. The particular memory location may be an address corresponding to, for example, a particular electronic folder, a particular machine or server, or a particular disk sector of a machine. The interface design engine may identify all or a subset of existing data sources from the particular memory location.

The interface design engine may identify all existing data sources stored at the particular memory location. The interface design engine may identify an identifier corresponding to each data source. The interface design engine may display a list of identifiers of the data sources stored at the particular memory location.

The interface design engine may identify a subset of the existing data sources stored at the particular memory location. The interface design engine may search through the data sources stored at the particular memory location to identify data sources that are associated with a particular tag. The interface design engine may identify an identifier corresponding to each tagged data source. The interface design engine may display a list of identifiers of the tagged data sources.

One or more embodiments include determining whether there is any user input selecting an existing data source (Operation 210). The interface design engine displays a user interface element for accepting user input selecting at least one of the existing data sources displayed at Operation 208. The user interface element may be, for example, a set of checkboxes corresponding to the data sources. The interface design engine may also display a user interface element accepting user input indicating that no data source is to be selected. As an example, the interface design engine may display a "Cancel" button, a "No Existing Data Source" button, and/or a "Default" button. The interface design engine receives user input via one or more user interface elements.

If there is user input selecting an existing data source, then the limited set of selectable values specified by the selected data source is used (Operation 212). The interface design engine stores the selected data source in association with the instance of the interface widget.

In an embodiment, the selected data source is a particular data field of a database and/or table. The database and/or table is associated with multiple data fields. Each entry, stored in the database and/or table, includes information corresponding to each data field. Values stored under the particular data field are identified as the limited set of selectable values to be used. Values stored under other data fields are not identified as the limited set of selectable values for the instance of the interface widget.

In an embodiment, the selected data source is a database and/or table. The database and/or table is organized according to a schema associated with multiple data fields. Each entry, stored in the database and/or table, includes information corresponding to each data field. A particular data field is tagged as storing the limited set of selectable values. The interface design engine identifies the particular data field based on the tag. Values stored under the particular data field are identified as the limited set of selectable values to be used. Values stored under other data fields are not identified as the limited set of selectable values for the instance of the interface widget.

If there is no user input selecting an existing data source, then a default set of selectable values is used (Operation 214). A default set of selectable values is stored in a data repository of the interface design engine. The interface design engine identifies the default set of selectable values from the data repository.

One or more embodiments include displaying a list comprising multiple destinations that may store data submitted via the instance of the interface widget (Operation 216).

In an embodiment, the interface design engine obtains a list identifying destinations that may be used for storing data submitted via the instance of the interface widget. The list is stored at a data repository of the interface design engine. The list identifies the destinations by referencing an address and/or identifier of the destinations. The interface design engine displays a list of the addresses and/or identifiers of the destinations.

In an additional or alternative embodiment, the interface design engine identifies destinations that may be used for storing data submitted via the instance of the interface widget from a particular memory location. The interface design engine obtains information identifying the particular memory location from a data repository of the interface design engine. The particular memory location may be an address corresponding to, for example, a particular electronic folder, a particular machine or server, or a particular disk sector of a machine. The interface design engine may identify all or a subset of destinations stored at the particular memory location.

The interface design engine may identify all destinations stored at the particular memory location. The interface design engine may identify an identifier corresponding to each destination. The interface design engine may display a list of identifiers of the destinations stored at the particular memory location.

The interface design engine may identify a subset of the destinations stored at the particular memory location. The interface design engine may search through the destinations stored at the particular memory location to identify destinations that are associated with a particular tag. The interface design engine may identify an identifier corresponding to each tagged destination. The interface design engine may display a list of identifiers of the tagged destinations.

One or more embodiments include determining whether there is any user input selecting a destination (Operation 218). The interface design engine displays a user interface element for accepting user input selecting at least one of the destinations displayed at Operation 216. The user interface element may be, for example, a set of checkboxes corresponding to the destinations. The interface design engine may also display a user interface element accepting user input indicating that no destination is to be selected. As an example, the interface design engine may display a "Cancel" button, a "No Destination" button, and/or a "Default" button. The interface design engine receives user input via one or more user interface elements.

If there is user input selecting a destination, then the selected destination is used (Operation 220). The interface design engine uses the selected destination for storing data submitted via the instance of the interface widget.

If there is no user input selecting a destination, then a default destination is used (Operation 222). Information identifying a default destination is stored in a data repository of the interface design engine. The interface design engine identifies the default destination from the data repository.

One or more embodiments include configuring the instance of the first interface widget using (a) the selected or default data source and/or (b) the selected and/or default destination (Operation 224). The interface design engine stores the customized widget properties associated with the instance of the interface widget. Storing customized widget properties comprises configuring a data source and/or a destination for the instance of the interface widget.

The interface design engine configures the instance of the interface widget for accepting a value from a limited set of selectable values specified by the selected data source. Hence, the instance of the interface widget is integrated with the existing data source selected at Operation 210. Alternatively, the interface design engine configures the instance of the interface widget for accepting a value from the default set of selectable values. The instance of the interface widget may only accept a value from the set of selectable values. The instance of the interface widget does not accept values other than the set of selectable values.

The interface design engine configures the instance of the interface widget to store data submitted via the instance of the interface widget at the selected destination or the default destination. The interface design engine maps data submission, received via the instance of the interface widget, to storage at the selected destination or the default destination.

4. Configuring a Form Property for a Particular Form

Figure 3:
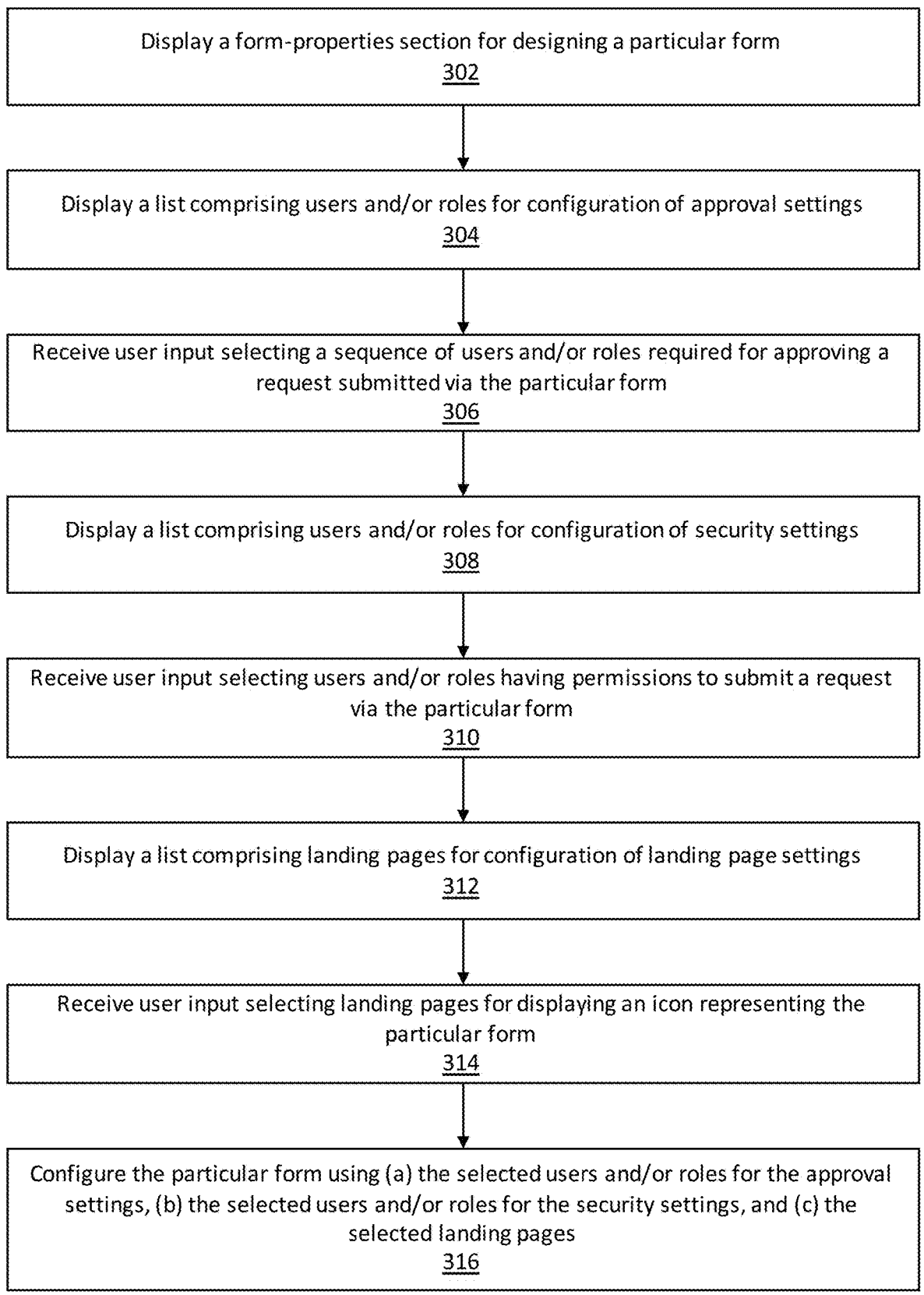
FIG. 3 illustrates an example set of operations for configuring a form property for a particular form, in accordance with one or more embodiments.

FIG. 3 illustrates an example set of operations for configuring a form property for a particular form, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include displaying a form-properties section for designing a particular form (Operation 302). An interface design engine displays a design user interface. The design user interface includes the form-properties section. The form-properties section includes customizable form properties of the particular form.

One or more embodiments include displaying a list comprising users and/or roles for configuration of approval settings (Operation 304).

In an embodiment, the interface design engine obtains a list identifying users and/or roles that are available for selection. The list is stored at a data repository of the interface design engine. The interface design engine identifies a name and/or identifier corresponding to each user and/or role in the list. The interface design engine displays a list of names and/or identifiers of the users and/or roles. The users and/or roles may be selected for configuring approval settings for the particular form.

In an additional or alternative embodiment, the interface design engine identifies the users and/or roles based on an existing data source. As an example, information identifying the users and/or roles may be stored in an existing database. The interface design engine retrieves and/or imports the names and/or identifiers of the users and/or roles from the data source. The interface design engine displays a list of names and/or identifiers of the users and/or roles. The users and/or roles may be selected for configuring approval settings for the particular form.

In an additional or alternative embodiment, the interface design engine identifies roles from the perspective of an end user submitting a request via the particular form. A role may be, for example, a supervisor of the end user. Another role may be, for example, a department head of a department of the end user. The interface design displays a list of the roles from the perspective of the end user. The roles may be selected for configuring approval settings of the particular form.

One or more embodiments include receiving user input selecting a sequence of users and/or roles required for approving a request submitted via the particular form (Operation 306). The interface design engine displays a user interface element for accepting user input selecting at least one of the users and/or roles displayed at Operation 304. The user interface element may be, for example, a set of checkboxes corresponding to the users and/or roles. The interface design engine receives user input via the user interface element. The selected users and/or roles are required for approving a request submitted via the particular form.

The interface design engine may receive user input selecting a particular sequence of users and/or roles. As an example, a first user input may comprise selecting user John Smith. A second user input may comprise selecting user Mary Jones. Based on the user input, an approval process for the particular form includes first obtaining approval from John Smith and then obtaining approval from Mary Jones.

One or more embodiments include displaying a list comprising users and/or roles for configuration of security settings (Operation 308).

In an embodiment, the interface design engine obtains a list identifying users and/or roles that are available for selection. The list is stored at a data repository of the interface design engine. The interface design engine identifies a name and/or identifier corresponding to each user and/or role in the list. The interface design engine displays a list of names and/or identifiers of the users and/or roles. The users and/or roles may be selected for configuring security settings of the particular form.

In an additional or alternative embodiment, the interface design engine identifies the users and/or roles based on an existing data source. As an example, information identifying the users and/or roles may be stored in an existing database. The interface design engine retrieves and/or imports the names and/or identifiers of the users and/or roles from the data source. The interface design engine displays a list of names and/or identifiers of the users and/or roles from the data source. The users and/or roles may be selected for configuring security settings of the particular form.

In an additional or alternative embodiment, the interface design engine identifies roles from the perspective of an end user submitting a request via the particular form. A role may be, for example, a supervisor of the end user. Another role may be, for example, a department head of a department of the end user. The interface design displays a list of the roles from the perspective of the end user. The roles may be selected for configuring security settings of the particular form.

The list of users and/or roles available for configuring security settings may be the same as or different from the list of users and/or roles, identified at Operation 304, available for configuring approval settings.

One or more embodiments include receiving user input selecting users and/or roles having permissions to submit a request via the particular form (Operation 310). The interface design engine displays a user interface element for accepting user input selecting at least one of the users and/or roles displayed at Operation 308. The user interface element may be, for example, a set of checkboxes corresponding to the users and/or roles. The interface design engine receives user input via the user interface element. The selected users and/or roles are associated with permissions for submitting a request via the particular form.

One or more embodiments include displaying a list comprising landing pages for configuration of landing page settings (Operation 312). The interface design engine identifies landing pages associated with one or more applications. Each landing page is to be displayed by the corresponding application to an end user of the application. The interface design engine identifies the names and/or identifiers of the landing pages. The interface design engine displays a list of names and/or identifies of the landing pages.

One or more embodiments include receiving user input selecting landing pages for displaying an icon representing the particular form (Operation 314). The interface design engine displays a user interface element for accepting user input selecting at least one of the landing pages displayed at Operation 312. The user interface element may be, for example, a set of checkboxes corresponding to the landing pages. The interface design engine receives user input via the user interface element. The selected landing pages are associated with the particular form.

One or more embodiments include configuring the particular form using (a) the selected users and/or roles for the approval settings, (b) the selected users and/or roles for the security settings, and (c) the selected landing pages (Operation 316). The interface design engine stores the customized form properties associated with the particular form. Storing the customized form properties comprises configuring approval settings, security settings, and/or landing pages for the particular form.

The interface design engine configures the particular form with a set of approval settings. The approval settings require that a request submitted via the particular form be approved by the sequence of users and/or roles selected at Operation 306.

The interface design engine configures the particular form with a set of security settings. The security settings provide permissions for submitting a request via the particular form to the users and/or roles selected at Operation 310. Users and/or roles that were not selected do not have permissions for submitting a request via the particular form.

The interface design engine associates the particular form with the selected landing pages. The interface design engine may add a tag to the selected landing pages. Based on the tag, a selected landing pages displays an icon representing the particular form.

5. Receiving a Request Via a Particular Form

Figure 4:
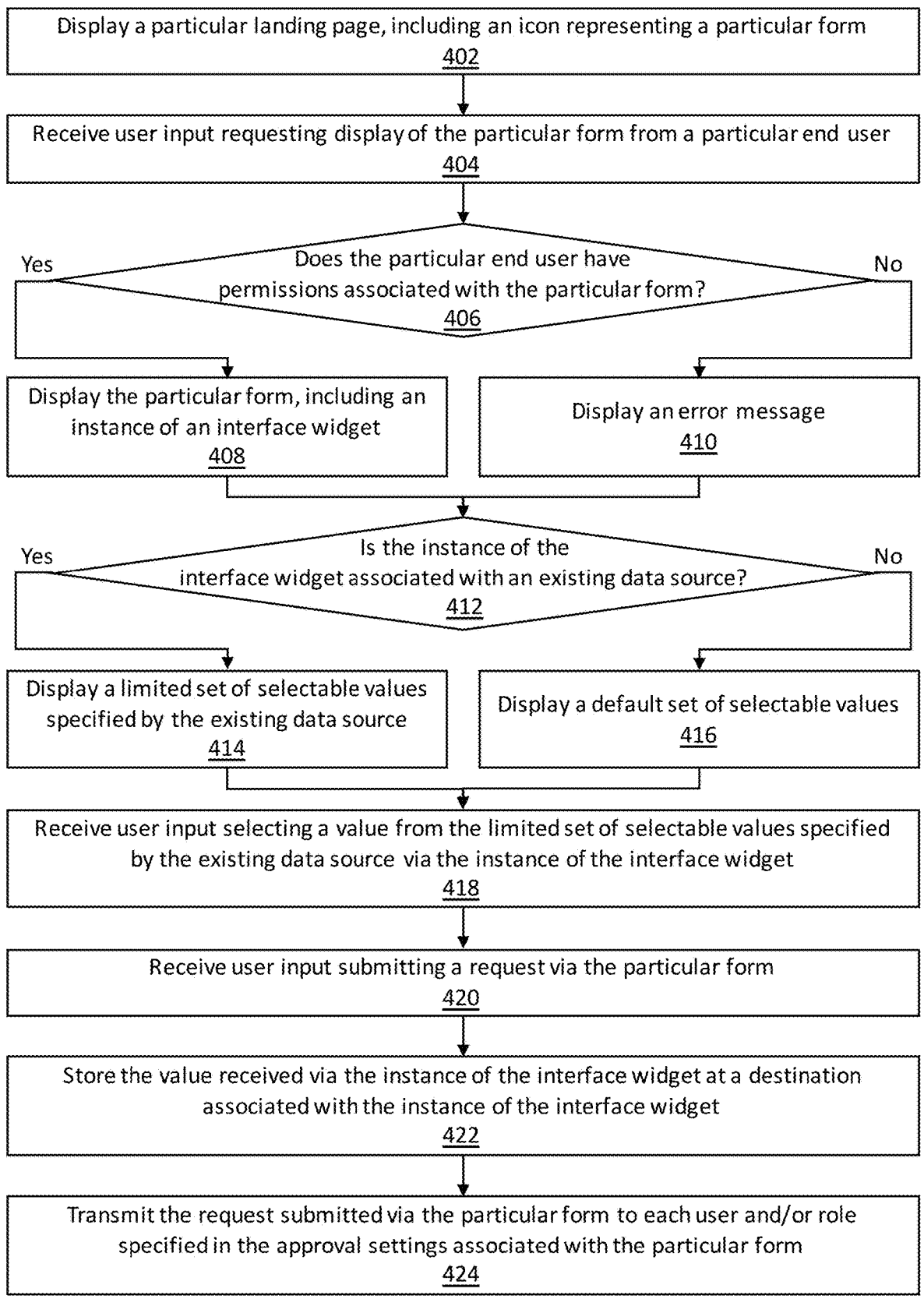
FIG. 4 illustrates an example set of operations for receiving a request via a particular form, in accordance with one or more embodiments.

FIG. 4 illustrates an example set of operations for receiving a request via a particular form, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include displaying a particular landing page, including an icon representing a particular form (Operation 402). Execution of a particular application is initiated by a particular end user. The particular application identifies one or more landing pages associated with the particular end user. The particular application determines that the particular landing page is associated with the particular form. Based on the association with the particular form, the particular application displays the particular landing page including the icon representing the particular form.

One or more embodiments include receiving user input requesting display of the particular form from the particular end user (Operation 404). The particular application receives user input selecting the icon representing the particular form from the particular landing page. The user input comprises a request to display the particular form.

One or more embodiments include determining whether the particular user has permissions associated with the particular form (Operation 406). The particular application obtains security settings associated with the particular form. The security settings are stored as part of the form properties of the particular form. The particular application determines whether the particular end user has permissions for submitting a request via the particular form based on the security settings.

The particular application identifies end users that have permissions to access the particular form based on the security settings. The particular application determines whether the particular end user is one of the end users that have permissions to access the particular form.

The particular application identifies roles that have permissions to access the particular form based on the security settings. The particular application determines whether the particular end user is associated with one of the roles that have permissions to access the particular form.

If the particular end user does not have permissions associated with the particular form, then an error message is displayed (Operation 410). The particular application does not display the particular form to the particular end user. The particular end user does not have access to the particular form.

If the particular end user has permissions associated with the particular form, then the particular form is displayed (Operation 408). The particular application identifies instances of interface widgets that have been selected for inclusion into the particular form. The particular application displays the particular form, including at least one instance of an interface widget.

One or more embodiments include determining whether the instance of the interface widget is associated with an existing data source (Operation 412). The particular application obtains widget properties of the instance of the interface widget. One widget property is a set of selectable values for the instance of the interface widget. The particular application determines whether an existing data source has been selected for specifying the set of selectable values.

If the instance of the interface widget is associated with an existing data source, then the particular form displays the limited set of selectable values specified by the existing data source (Operation 414). The particular application identifies the data source associated with the instance of the interface widget based on the widget properties of the instance of interface widget. The particular application retrieves and/or imports the limited set of selectable values from the data source. The particular application displays the limited set of selectable values in the particular form. The limited set of selectable values are provided to the particular end user for selection. At least one of the limited set of selectable values may be selected for submission via the instance of the interface widget.

In an embodiment, the particular application retrieves the limited set of selectable values that are currently stored by the data source. The limited set of selectable values currently stored by the data source may be the same as or different from the limited set of selectable values that were stored by the data source at the time the instance of the interface widget was configured to become associated with the data source. As an example, during the design of a particular form, an instance of an interface widget may be configured as being associated with a particular data source. The particular data source may include the values: United States, Canada. Subsequently, the particular form may be displayed to an end user. At this time, the particular data source may include the values: United States, Mexico. The particular form may display a limited set of selectable values for the instance of the interface widget. The limited set of selectable values are the values currently stored by the data store: United States, Mexico.

In an embodiment, the particular application retrieves the limited set of selectable values from a particular data field of the data source. The data source is organized according to a schema associated with multiple data fields. Each entry, stored in the data source, includes information corresponding to each data field. A particular data field is tagged as storing the limited set of selectable values. The particular application displays values stored under the particular data field as the limited set of selectable values for the instance of the interface widget.

If the instance of the interface widget is not associated with an existing data source, then the particular form displays a default set of selectable values (Operation 416). The particular application obtains the default set of selectable values from a data repository. The particular application displays the default set of selectable values in the particular form. The default set of selectable values are provided to the particular end user for selection. At least one of the default set of selectable values may be selected for submission via the instance of the interface widget.

One or more embodiments include receiving user input selecting a value from the limited set of selectable values specified by the existing data source via the instance of the interface widget (Operation 418). The particular application displays a user interface element for accepting user input selecting a value from the set of selectable values. The user interface element may be, for example, a dropdown menu. The particular application receives user input via the user interface element.

One or more embodiments include receiving user input submitting a request via the particular form (Operation 420). The particular application receives user input to one or more fields of the particular form. The particular application displays a user interface element for accepting user input submitting a request via the particular form. The user interface element may be, for example, a "Submit" button. The particular application receives user input via the user interface element. Based on the user input, information received via the fields of the particular form, including the instance of the interface widget, are submitted.

One or more embodiments include storing the value received via the instance of the interface widget at a destination associated with the instance of the interface widget (Operation 422). The particular application identifies the destination based on the widget properties associated with the instance of the interface widget. The particular application causes the value received via the instance of the interface widget to be stored at the destination. The particular application may transmit the received value to the destination. Alternatively, the particular application may directly store the received value at the destination.

One or more embodiments include transmitting the request submitted via the particular form to each user and/or role specified in the approval settings associated with the particular form (Operation 424). The particular application identifies a sequence of users and/or roles that are required for approving the request submitted via the particular form from the approval settings of the particular form. The approval settings are stored as part of the form properties associated with the particular form.

In an embodiment, the sequence of users and/or roles may include User X. In an embodiment, execution of the particular application is initiated by User X. Upon execution of the particular application, the particular application may display the request, submitted by the particular end user, to User X. In an alternative embodiment, the particular application transmits the request to User X via electronic mail or other means.

In an embodiment, the sequence of users and/or roles may include a particular role. The particular role may be a title within the company, such as "Chief Executive Officer." Alternatively, the particular role may be specified from the perspective of the particular end user. The particular role may be, for example, a supervisor of the end user. The particular application may determine that User Y is associated with the particular role. The particular application transmits the request, submitted by the particular end user, to User Y.

The particular application transmits the request to the first user and/or role in the sequence of users and/or roles that are required for approving the request submitted via the particular form. The particular application receives user input approving the request from the first user and/or role. The particular application transmits the request to the next user and/or role in the sequence of users and/or roles that are required for approving the request. The particular application receives user input approving the request from the next user and/or role. The particular application thus transmits the request to each of the users and/or roles that are required for approving the request.

6. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

FIGS. 5A-5I illustrate example screenshots of a design user interface for designing a particular form, in accordance with one or more embodiments. The particular form is to be used for submitting tuition reimbursement requests to a company.

As illustrated, the design user interface includes tabs 530-538. Tab 530 corresponds to a "Form" tab. Tab 532 corresponds to a "Layout" tab. Tab 534 corresponds to an "Instructions" tab. Tab 536 corresponds to an "Approval" tab. Tab 538 corresponds to a "Security" tab.

Screenshot 500 shows the design user interface under the "Form" tab. Under the "Form" tab, the design user interface includes elements 539. Elements 539 are customizable form properties associated with the tuition reimbursement form. The customizable form properties include a label and/or name of the form, a description of the form, a status of the form, effective dates of the form, and an owner of the form.

Screenshot 502 shows the design user interface under the "Layout" tab. Under the "Layout" tab, the design user interface includes sections 540-544. Section 540 corresponds to a widget-selection section. Section 542 corresponds to a form-design section. Section 544 corresponds to a widget-properties section.

Section 540 includes available interface widgets 546. Section 540 provides interface widgets 546 that are available for selection. Interface widgets 546 may be selected for inclusion into the tuition reimbursement form. A user may select an interface widget 546 by dragging the interface widget 546 from section 540 to section 542.

Interface widgets 546 include a text field, a prompt field, a yes/no field, a code field, a date selection field, a number field, a signed number field, and a divider. A code field is associated with a set of selectable values. The set of selectable values are specified by a user designing the tuition reimbursement form. A prompt field is associated with a set of selectable values. The set of selectable values are specified by an existing data source. The existing data source is selected by a user designing the tuition reimbursement form.

Section 542 includes form template 547. Form template 547 has particular dimensions suited for being displayed on a computer monitor. Form template 547 includes instances of interface widgets 546 that have been selected. Form template 547 displays an instance of an interface widget 546 at a particular location at which the interface widget 546 was dropped by a user.

Section 544 includes customizable widget properties 548. Customizable widget properties 548 correspond to one or more instances of widget interfaces shown in form template 547. After a particular interface widget 546 is dropped in section 542, the customizable widget properties 548 associated with the particular interface widget 546 are shown in section 544.

Screenshot 504 shows customizable widget properties 550 for an instance of a prompt field. Customizable widget properties 550 include a label and/or name of the instance, a status of the instance, and a description of the instance. Customizable widget properties 550 further include a prompt record for the instance of the prompt field. The prompt record is an existing data source to be associated with the instance of the prompt field. The set of selectable values, for the instance of the prompt field, is specified by the associated data source. A user designing the tuition reimbursement form may click on the user interface element representing the prompt record to select a data source to be associated with the instance of the prompt field. In response to receiving user input clicking on the user interface element, screenshot 506 is shown.

Screenshot 506 shows a list of data sources 552 that may be associated with the instance of the prompt field. The design interface engine obtains the list of data sources 552 from a data repository. Each data source 522 is associated with a name and a description.

Screenshot 508 shows an example of a data source 522 for departments of a company. The design interface engine retrieves information stored by the data source 522. Data source 522 is organized according to a schema associated with data fields 553. Data fields 553 include Department Number, Description, and Manager Name. Data source 522 includes entries 554. One entry 554 includes "10000" under Department Number, "Human Resources" under Description, and "Ball, Nancy" under Manager Name. Another entry 554 includes "10500" under Department Number, "Benefits" under Description, and "Ford, Jane" under Manager Name.

The Department Number data field stores the set of selectable values for the instance of the prompt field. Hence, the set of selectable values includes "10000" and "10500." Selection of a value from the set of selectable values represents selection of an entry 554 from data source 522.

Screenshot 510 shows the design user interface under the "Layout" tab. Screenshot 510 includes user interface elements representing various layouts 556. Layouts 556 includes a layout for a computer monitor, a layout for a smartphone, and a layout for a tablet. A user designing the tuition reimbursement form may select a user interface element representing a particular layout 556. Form template 547 is modified based on the selection.

Figure 5A:
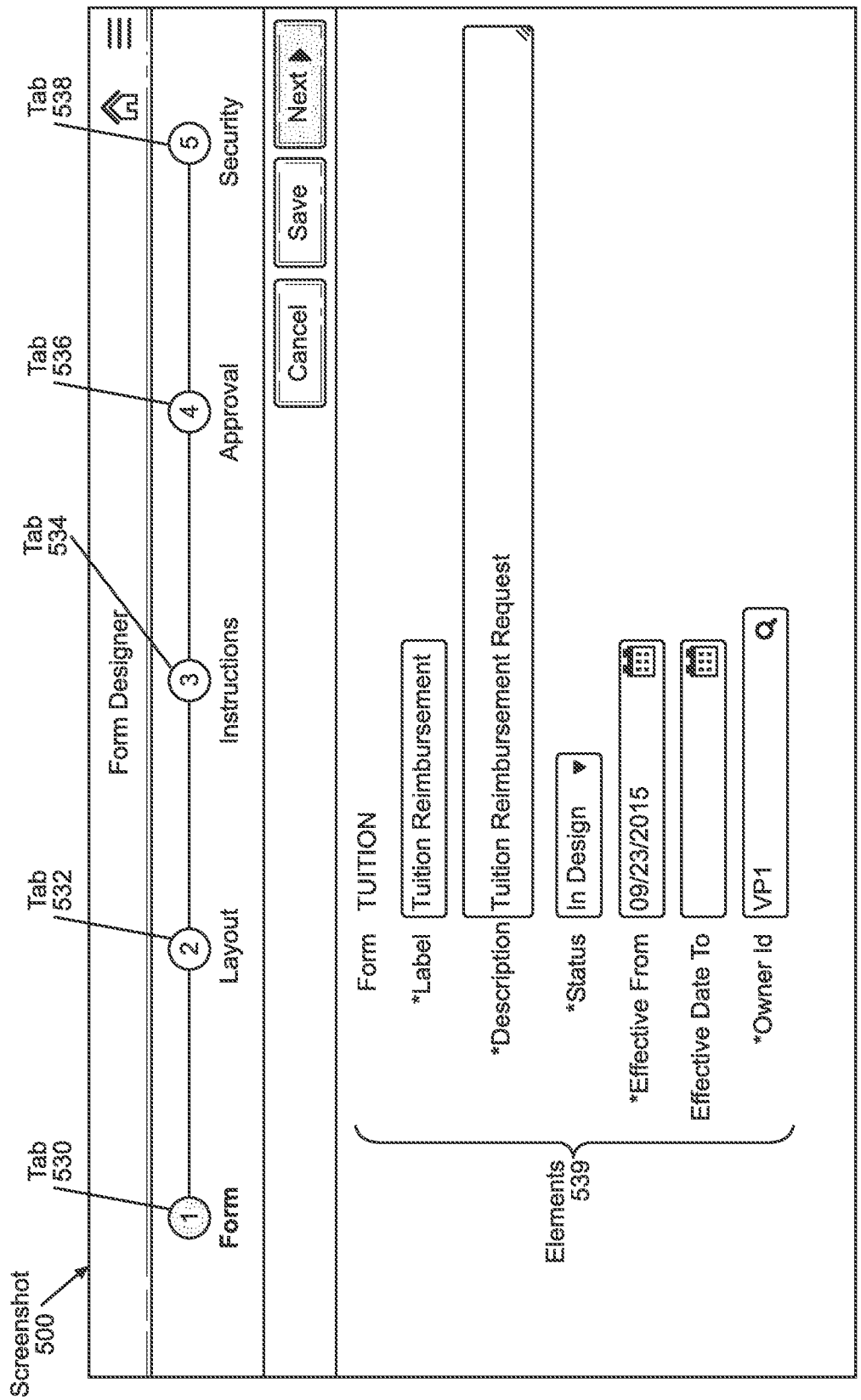
Figure 5B:
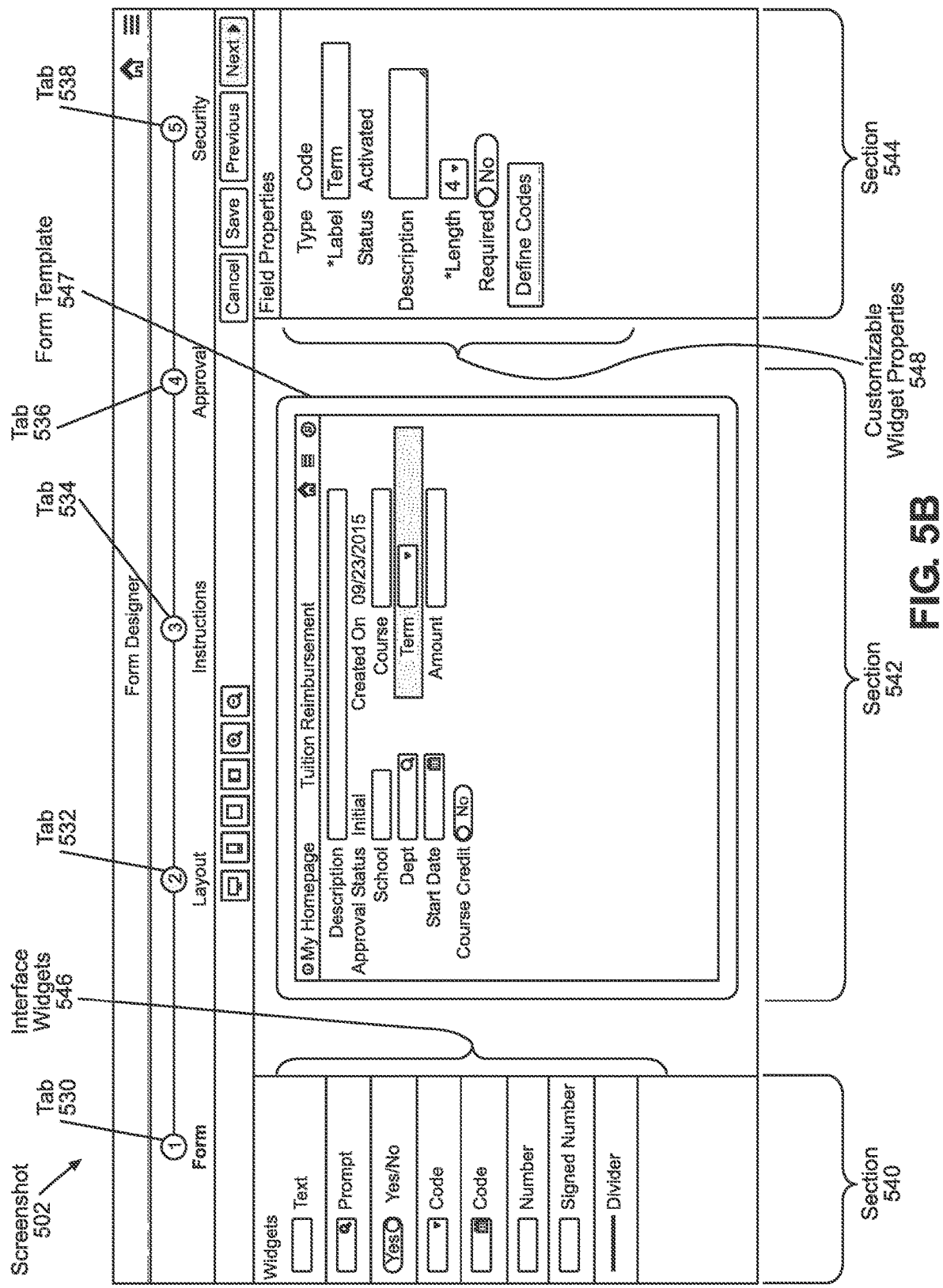
Figure 5C:
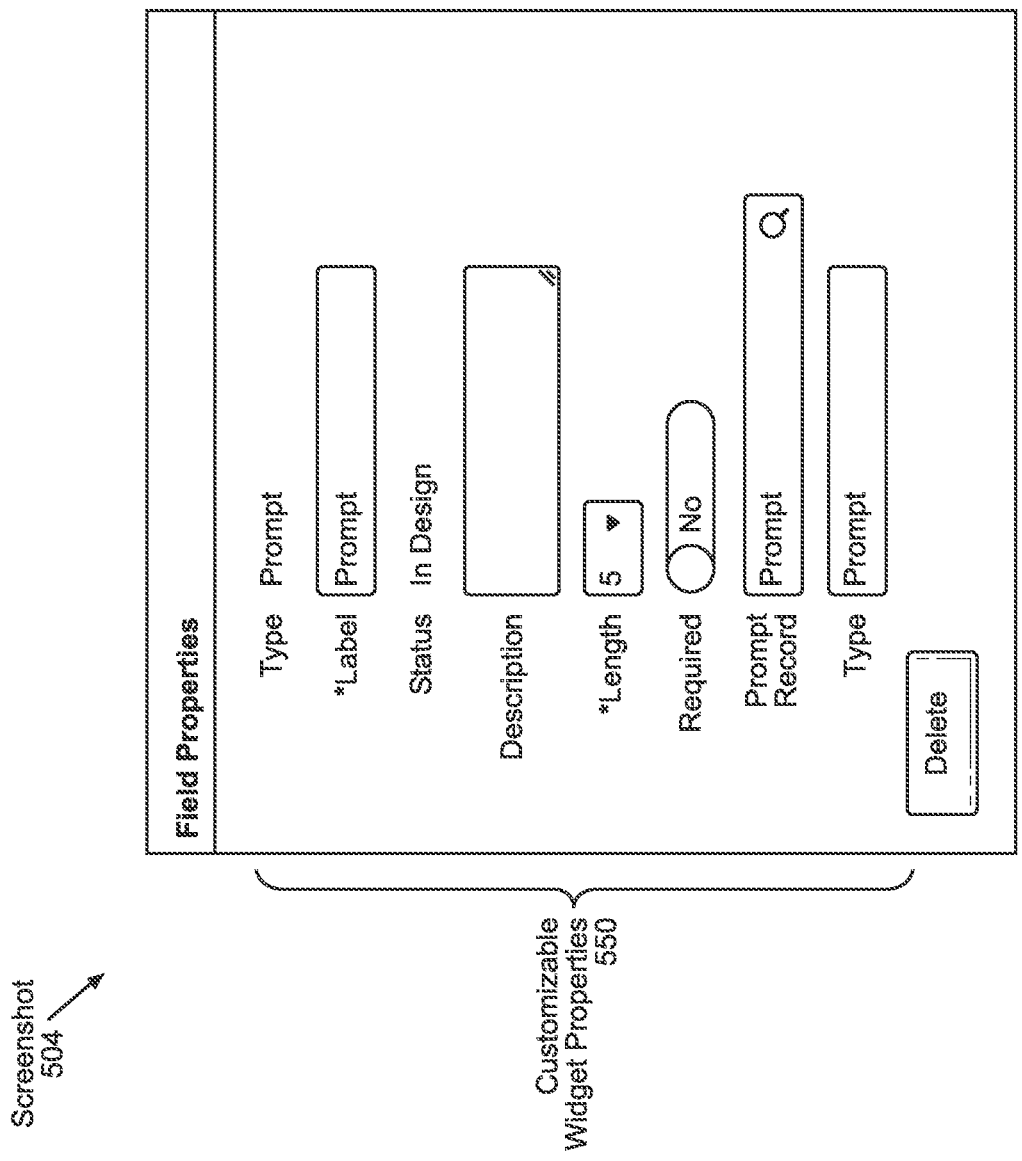
Figure 5F:
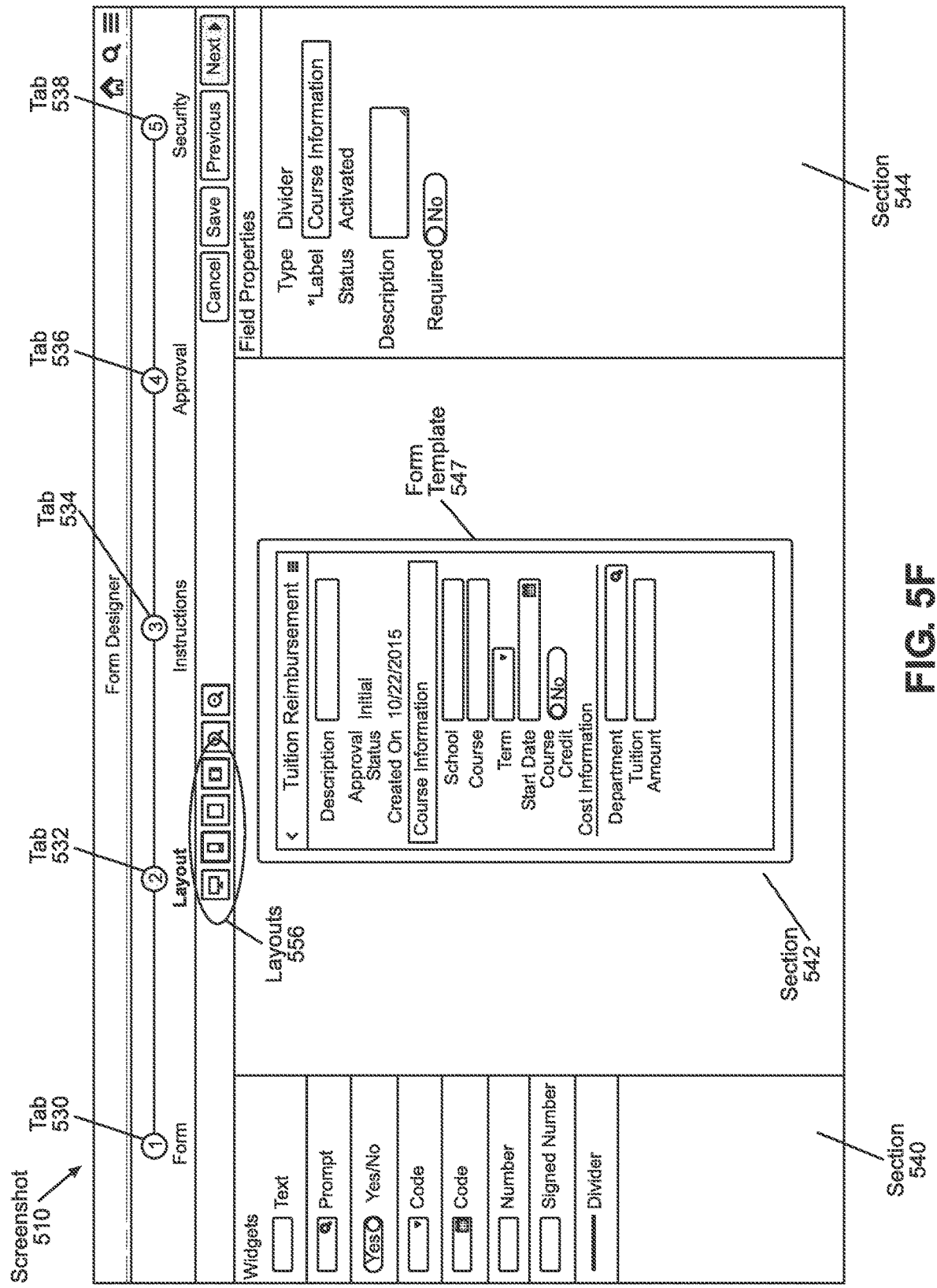
Figure 5G:
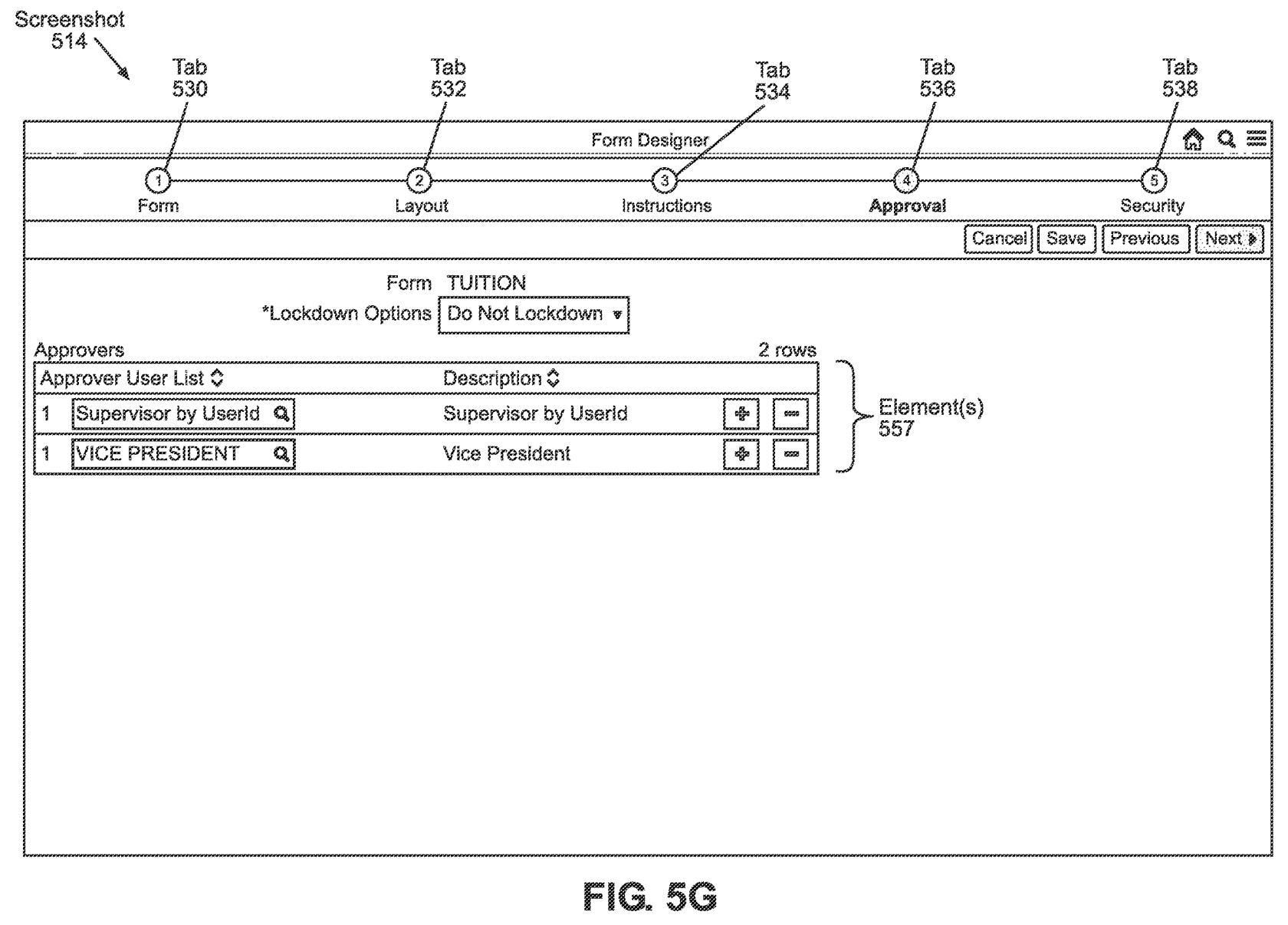
Figure 5H:
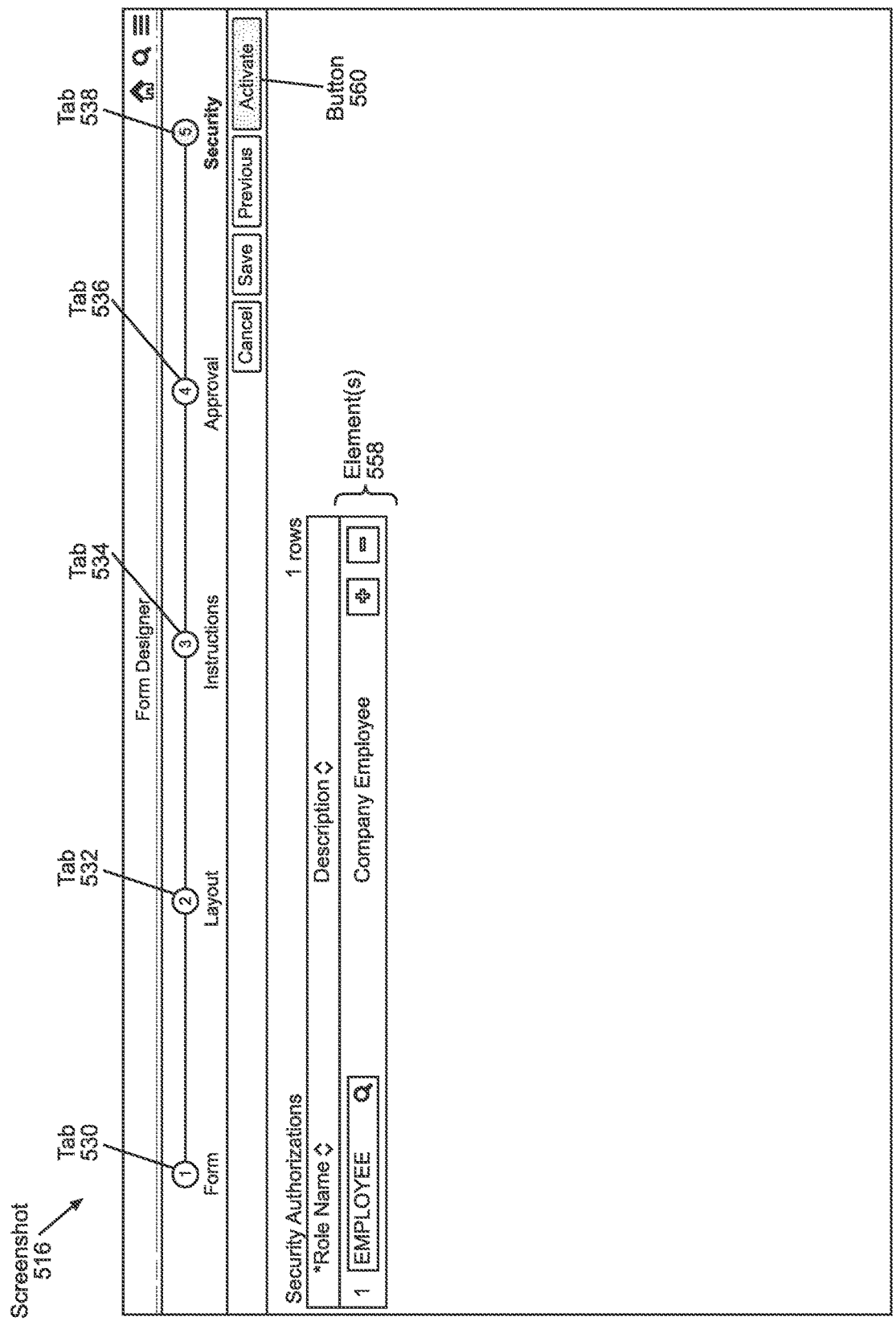

The dimensions of form template 547 are modified based on the selected layout 556. Referring to FIGS. 5B and 5F, screenshot 502 shows form template 547 having dimensions suited for being displayed by a computer monitor. Screenshot 510 shows form template 547 having dimensions suited for being displayed by a smartphone.

The interface widgets in form template 547 are rearranged based on the selected layout 556. The interface widgets in screenshot 502 are placed in two columns on the target user interface displaying the tuition reimbursement form. As an example, a text field labeled "School" is on the left column, while a text field labeled "Course" is on the right column. In contrast, the interface widgets in screenshot 510 are placed in a single column on the target user interface displaying the tuition reimbursement form. As an example, the text field labeled "School" is above the text field labeled "Course." The same text fields appear in both screenshots 502 and 510, but the text fields appear in different positions relative to each other.

Screenshot 514 shows the design user interface under the "Approval" tab. Screenshot 514 includes elements 557. Elements 557 are configured to accept user input selecting a sequence of users and/or roles required for approving a request submitted via the tuition reimbursement form. A user designing the tuition reimbursement form may click on elements 557. In response to the user input, the design user interface identifies users and/or roles available for selection from a data repository. As an example, the design user interface may import the users and/or roles from an application configured to manage employee profiles of the company. The design user interface displays a list of the users and/or roles. The design user interface accepts user input selecting one of the users and/or roles. The design user interface may accept further user input selecting additional users and/or roles. The design user interface may accept user input ordering the selected users and/or roles in a particular sequence.

Screenshot 516 shows the design user interface under the "Security" tab. Screenshot 516 includes elements 558. Elements 558 are configured to accept user input selecting users and/or roles having permissions to submit a request via the tuition reimbursement form. A user designing the tuition reimbursement form may click on elements 558. In response to the user input, the design user interface identifies users and/or roles available for selection from a data repository. As an example, the design user interface may import the users and/or roles from an application configured to manage employee profiles of the company. The design user interface displays a list of the users and/or roles. The design user interface accepts user input selecting one of the users and/or roles. The design user interface may accept further user input selecting additional users and/or roles.

As illustrated in this example, a first user and/or role required in the approval process is a supervisor of a particular end user submitting a request via the tuition reimbursement form. A second user and/or role required in the approval process is a vice president.

Screenshot 516 includes button 560. Button 560 is labeled "Activate." A user designing the tuition reimbursement form may click on button 560. In response to the user input, the design interface engine stores the tuition reimbursement form. The design interface engine configures the instance of the prompt widget such that the set of selectable values are specified by the selected data source. The design interface engine configures the tuition reimbursement form such that a request submitted via the tuition reimbursement form is approved by the selected sequence of users and/or roles. The design interface engine configures the tuition reimbursement form such that the selected users and/or roles have permissions to submit a request via the tuition reimbursement form.

Screenshot 518 shows a list of forms that have been designed using the design interface engine. The list of forms includes the tuition reimbursement form. Screenshot 518 includes button 562. Button 562 is labeled "Add to Homepage." A user may click on button 562. In response to the user input, the design interface engine identifies landing pages 564 from a data repository. As an example, the design user interface may import information identifying landing pages 564 from a particular application. Landing pages 564 includes, for example, an Employee Self Service page, and a Learning Center page. The design user interface accepts user input selecting one or more of landing pages 564. The selected landing pages 564 are configured to display an icon representing the tuition reimbursement form.

Figure 6A:
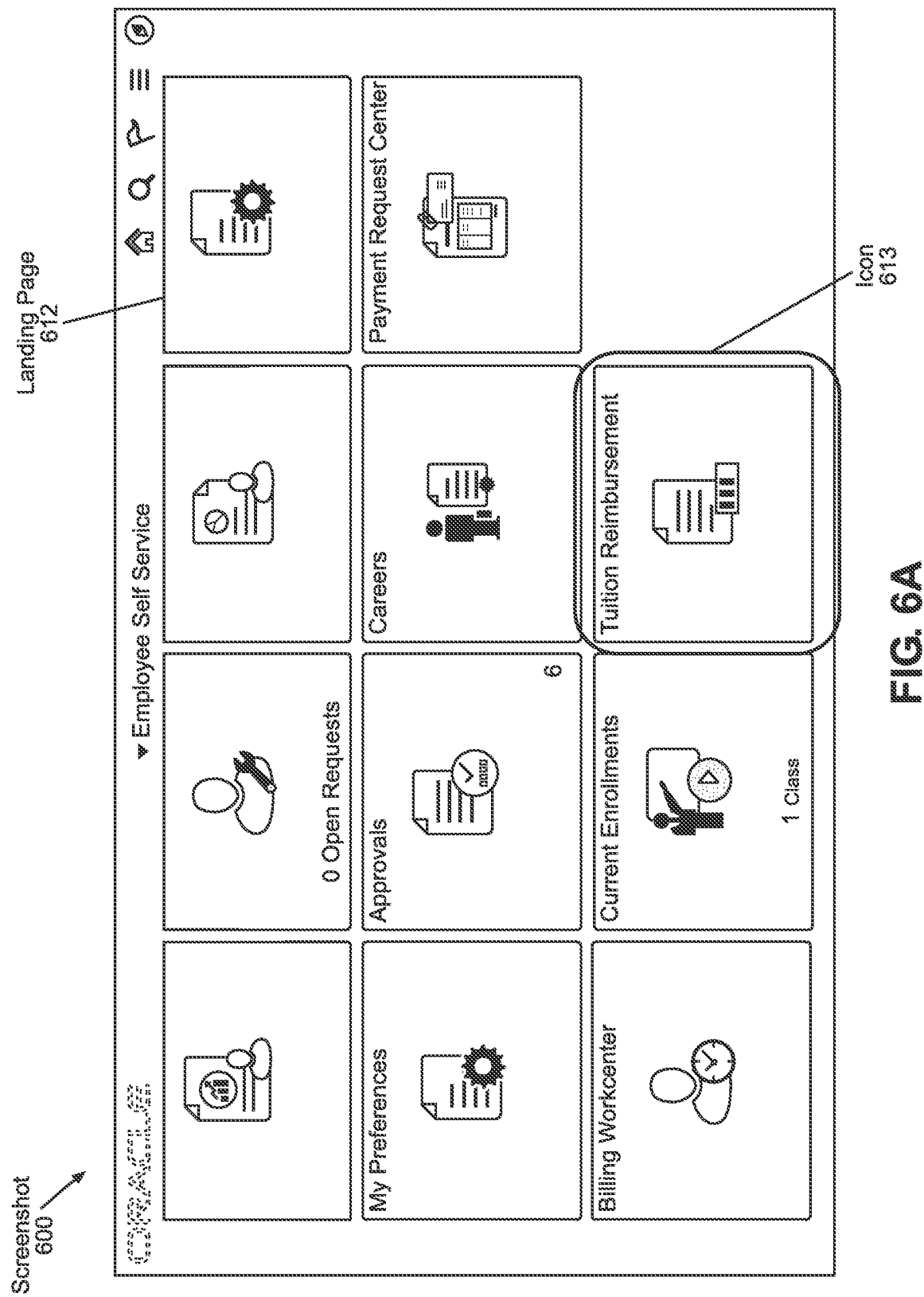
FIGS. 6A-6C illustrate example screenshots for submitting a request via a particular form, in accordance with one or more embodiments.
Figure 6B:
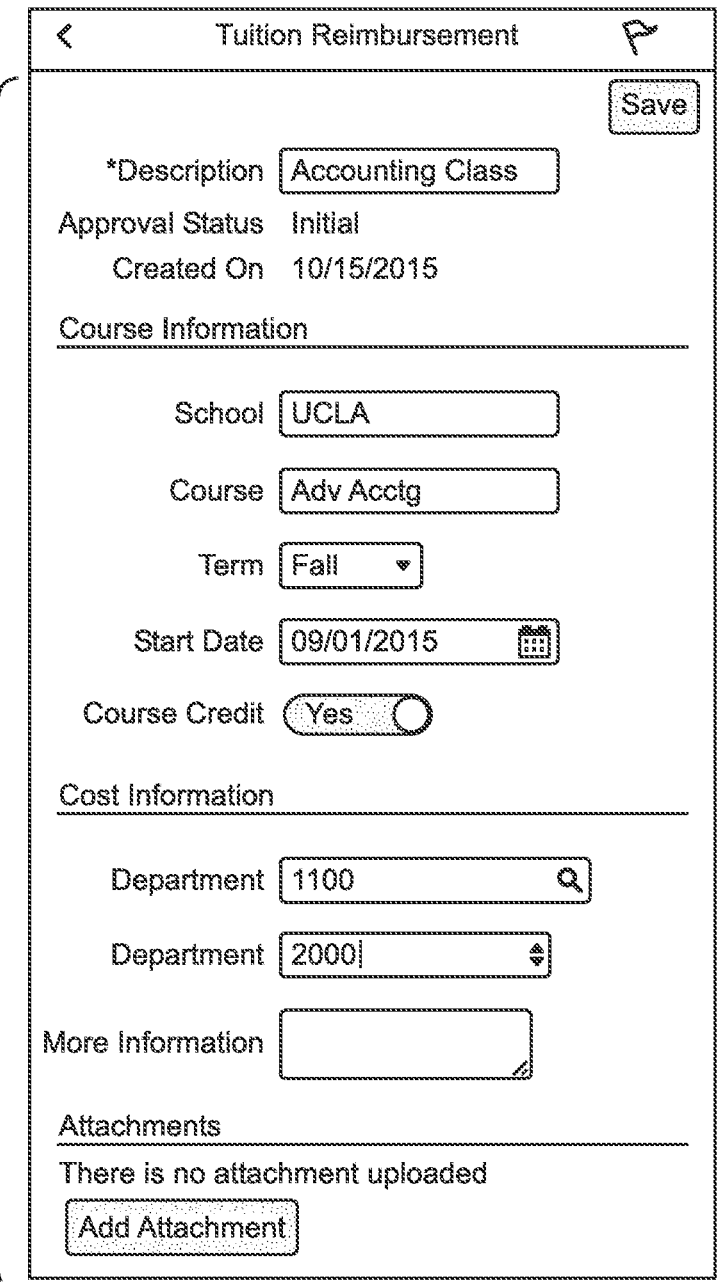
Figure 6C:
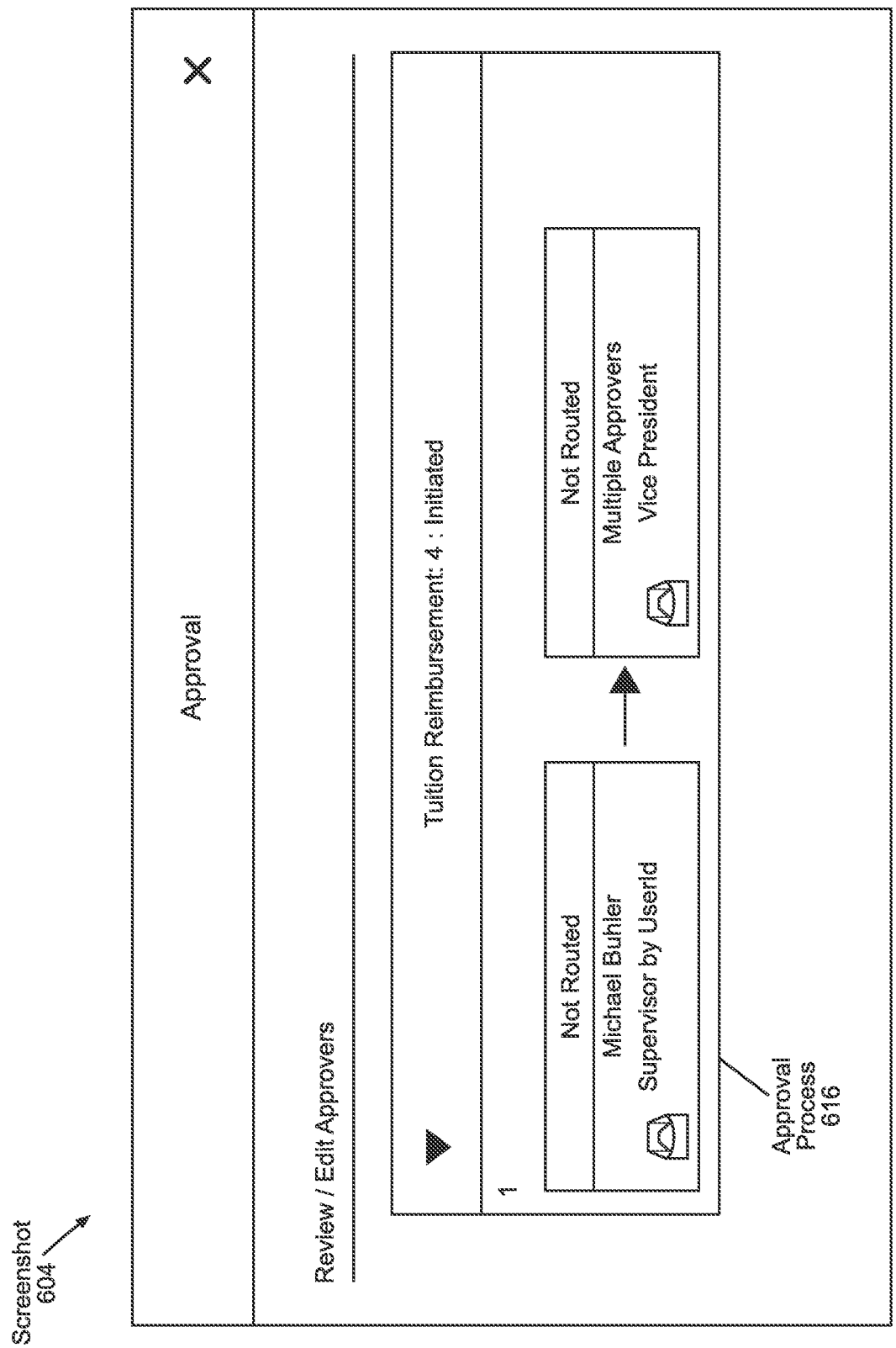

FIGS. 6A-6C illustrate example screenshots for submitting a request via a particular form, in accordance with one or more embodiments.

An end user initiates execution of a particular application. The particular application identifies landing pages 612 that are accessible by the end user. A landing page 612 may be tagged to indicate that the landing page 612 is associated with a particular form.

One landing page 612 accessible to the end user is the "Employee Self Service" landing page 612. A tag associated with the "Employee Self Service" landing page 612 indicates that the "Employee Self Service" landing page is associated with the tuition reimbursement form.

Screenshot 600 shows the "Employee Self Service" landing page 612. The "Employee Self Service" landing page includes an icon 613 representing the tuition reimbursement form. The particular application accepts user input selecting icon 613. In response to the user input, the particular application displays the tuition reimbursement form.

Screenshot 602 shows the tuition reimbursement form. The tuition reimbursement form includes elements 614. Elements 614 includes, for example, a text field labeled "School" and a text field labeled "Course." Elements 614 further includes a prompt field labeled "Department." The end user may select the prompt field. The particular application identifies a data source associated with the prompt field. The particular application obtains a set of selectable values from the associated data source. The particular application displays the set of selectable values. The particular application accepts user input selecting a value from the set of selectable values. The particular application stores information submitted via elements 614.

Screenshot 604 shows an approval process 616 for the tuition reimbursement form. Based on the form properties of the tuition reimbursement form, the approval process 616 includes the following sequence of users and/or roles: (1) a supervisor of the end user, and (2) one or more vice presidents. The particular application identifies the supervisor of the end user from a data repository. The particular application transmits the request of the end user to the supervisor. The particular application receives user input indicating an approval of the request from the supervisor. The particular application identifies the vice presidents from a data repository. The particular application transmits the request to at least one of the vice presidents. The particular application receives user input indicating an approval of the request from the vice president.

Figure 7:
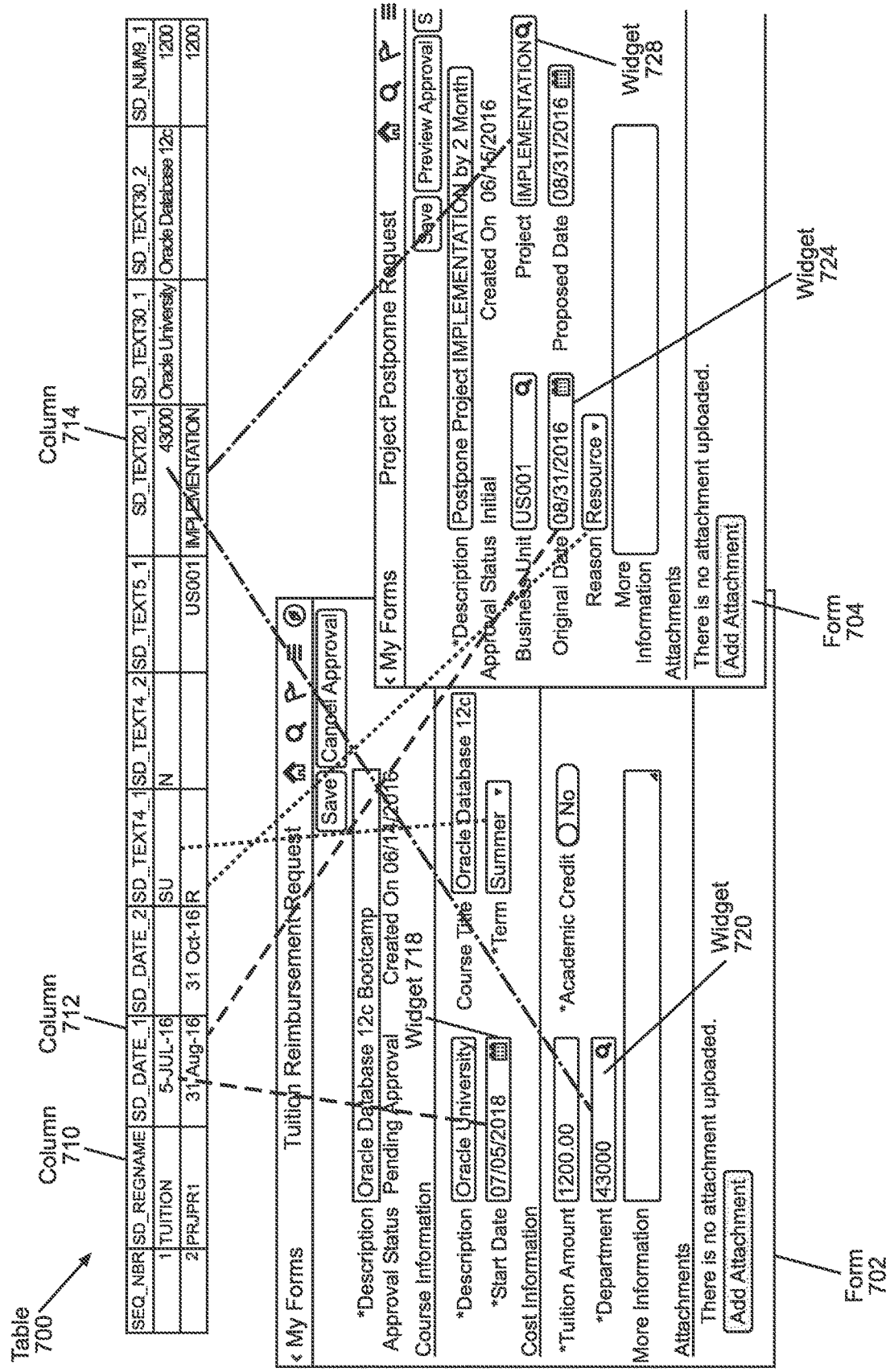
FIG. 7 illustrates an example of a destination that is shared by two forms, in accordance with one or more embodiments.

FIG. 7 illustrates an example of a destination that is shared by two forms, in accordance with one or more embodiments.

Table 700 is a destination that is shared by forms 702-704. Table 700 is configured to store requests submitted by either form 702 or form 704. Form 702 is a tuition reimbursement form. Form 704 is a project postponement form. Forms 702-704 are associated with a particular application.

Table 700 includes columns 710-714. Column 710 stores an identifier of a particular form that is being used to submit a request, such as form 702 or form 704. Column 712 stores data submitted via widget 718 of form 702 and data submitted via widget 724 of form 704. Column 714 stores data submitted via widget 720 of form 702 and data submitted via widget 728 of form 704.

Table 700 includes two entries. The first entry is a request submitted via form 702. The second entry is a request submitted via form 704.

A particular end user uses form 702 to submit a tuition reimbursement request. The particular end user enters "July 5, 2016" into widget 718. The particular end user selects the value "43000" from a set of selectable values for widget 720.

The particular application determines that the destination for widget 718 is column 712. The particular application determines that the destination for widget 720 is column 714. The particular application stores "July 5, 2016" under column 712 and "43000" under column 714.

An additional end user uses form 704 to submit a project postponement request. The additional end user enters "August 31, 2016" into widget 724. The additional end user selects the value "Implementation" from a set of selectable values for widget 728.

The particular application determines that the destination for widget 724 is column 712. The particular application determines that the destination for widget 728 is column 714. The particular application stores "August 31, 2016" under column 712 and "Implementation" under column 714.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
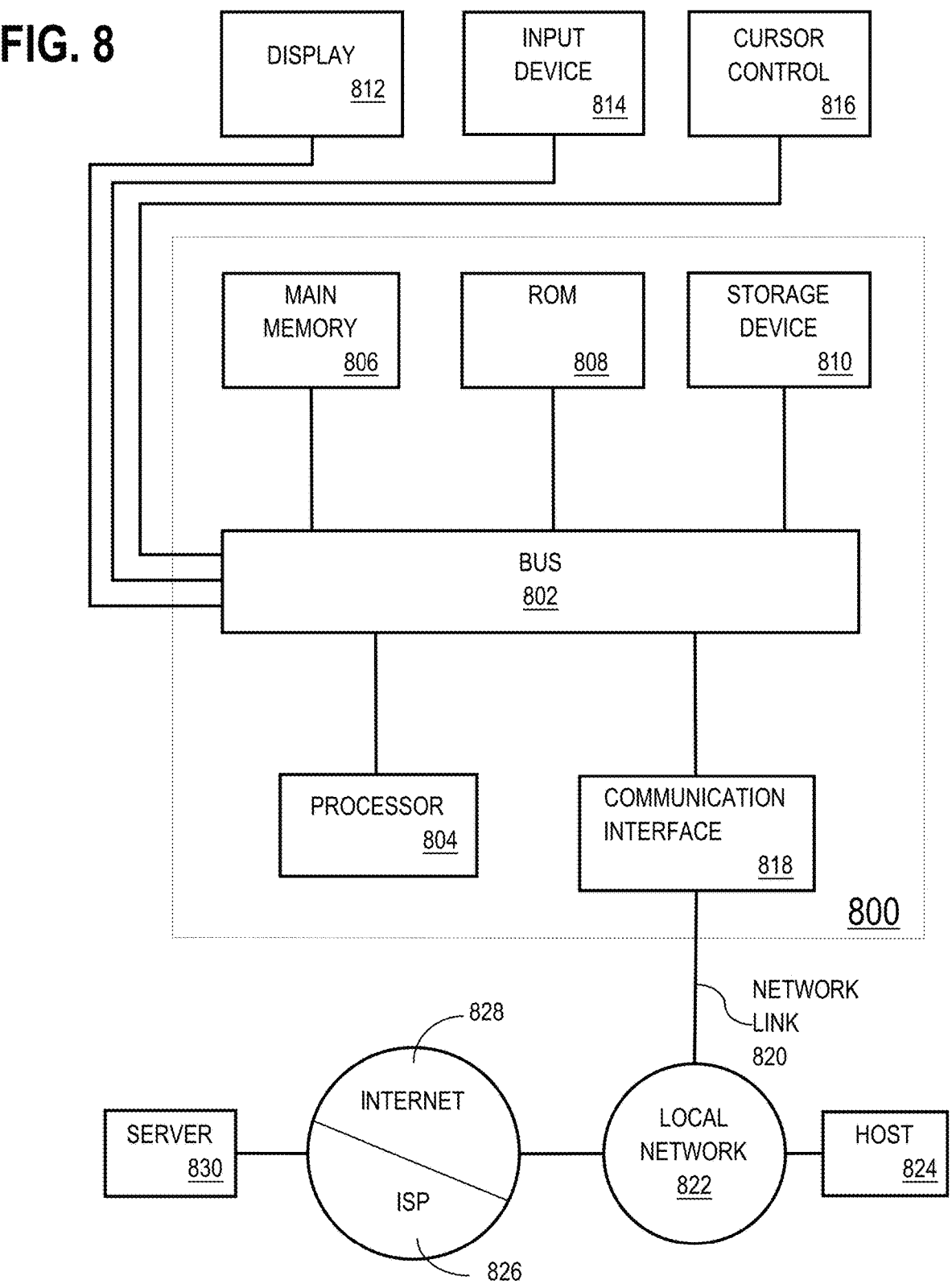
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    concurrently displaying, on a graphical user interface (GUI), at least a widget-selection section and a form-design section;
    displaying available interface widgets in the widget-selection section;
    displaying a form template, in a first layout associated with a first set of dimensions, in the form-design section;
    responsive at least to receiving a first user input dragging a first interface widget, of the available interface widgets, to a first location in the form template in the first layout:
        displaying a first instance of the first interface widget at the first location in the form template in the first layout;
    displaying a first plurality of destinations;
    responsive at least to receiving a second user input selecting a first destination of the first plurality of destinations:
        configuring the first instance of the first interface widget to store a first data submission at the selected first destination, wherein the first data submission is made through the first instance of the first interface widget;
    responsive at least to receiving a third user input dragging the first interface widget, of the available interface widgets, to a second location in the form template in the first layout:
        displaying a second instance of the first interface widget at the second location in the form template in the first layout;
    displaying the first plurality of destinations;
    responsive at least to not receiving any user input selecting any destination of the first plurality of destinations:
        configuring the second instance of the first interface widget to store a second data submission at a default destination, wherein the second data submission is made through the second instance of the first interface widget;
    responsive to a fourth user request to display the form template in a second layout associated with a second set of dimensions:
        displaying the form template, in the second layout associated with the second set of dimensions, in the form-design section;
        rearranging, based on the second layout, a set of one or more instances of interface widgets displayed in the form template in the first layout, wherein the set of instances of interface widgets comprises the first instance of the first interface widget; and
    displaying the first instance of the first interface widget at a third location in the form template in the second layout.

2. The one or more media of claim 1, further storing instructions which cause:
    displaying a list associated with the first instance of the first interface widget, wherein the list comprises a plurality of existing data sources;
    responsive to receiving a fifth user input selecting at least one of the plurality of existing data sources:
        configuring the first instance of the first interface widget for accepting a value from a set of values specified by the selected existing data source of the plurality of existing data sources.

3. A system, comprising:
    at least one device including a hardware processor;
    the system being configured to perform operations comprising:
    concurrently displaying, on a graphical user interface (GUI), at least a widget-selection section and a form-design section;
    displaying available interface widgets in the widget-selection section;
    responsive at least to receiving a first user input dragging a first interface widget, of the available interface widgets, from the widget-selection section to the form-design section:
        displaying a first instance of the first interface widget in the form-design section;
    displaying a first plurality of destinations;
    responsive at least to receiving a second user input selecting a first destination of the first plurality of destinations: configuring the first instance of the first interface widget to store a first data submission at the selected first destination, wherein the first data submission is made through the first instance of the first interface widget;

responsive at least to receiving a third user input dragging the first interface widget, of the available interface widgets, from the widget-selection section to the form-design section:

displaying a second instance of the first interface widget in the form-design section;

displaying the first plurality of destinations; and responsive at least to not receiving any user input selecting any destination of the first plurality of destinations: configuring the second instance of the first interface widget to store a second data submission at a default destination, wherein the second data submission is made through the second instance of the first interface widget.

4. The system of claim 3, wherein the operations further comprise:

displaying a list associated with the first instance of the first interface widget, wherein the list comprises a plurality of existing data sources;

responsive to receiving a fourth user input selecting at least one of the plurality of existing data sources:

configuring the first instance of the first interface widget for accepting a value from a set of values specified by the selected existing data source of the plurality of existing data sources.

5. The system of claim 3, wherein the operations further comprise:

receiving the first data submission through the first instance of the first interface widget;

receiving the second data submission through the second instance of the second interface widget;

storing the first data submission at the first destination; and storing the second data submission at the default destination.

6. The system of claim 3, wherein the operations further comprise:

displaying a list associated with the first instance of the first interface widget, wherein the list comprises a plurality of existing data sources;

responsive to not receiving any user input selecting any of the plurality of existing data sources:

configuring the first instance of the first interface widget for accepting a value from a default set of values.

7. One or more non-transitory machine-readable media storing instructions which, when executed by one or more processors, cause:

concurrently displaying at least a widget-selection section and a form-design section on a graphical user interface (GUI);

displaying available interface widgets, for designing a particular form, in the widget-selection section;

displaying a form template, in a first layout associated with a first set of dimensions, in the form-design section;

wherein the form-design section is configured to receive a first drag-and-drop user input to place a first interface widget, of the available interface widgets, at a first location in the form template in the first layout;

responsive at least to receiving the first drag-and-drop user input to place the first interface widget, of the available interface widgets, at the first location in the form template in the first layout:

displaying a first instance of the first interface widget at the first location in the form template in the first layout;

displaying, concurrently with the widget-selection section and the form-design section, a customizable-widget-properties section including user interface elements configured to receive configurations for customizable widget properties for the first instance of the first interface widget;

wherein the customizable widget properties comprise a data source specifying a candidate set of values to be accepted by the first instance of the first interface widget;

identifying a particular memory location storing a candidate set of data sources, wherein the particular memory location is an address corresponding to at least one of: a particular electronic folder, a particular machine or server, or a particular disk sector of a machine;

searching through the candidate set of data sources stored at the particular memory location to identify a first subset of the candidate set of data sources that are associated with a particular tag, wherein a second subset of the candidate set of data sources are not associated with the particular tag;

wherein the first subset of the candidate set of data sources that are associated with the particular tag includes two or more databases, records, logs, tables, or lists;

displaying a first list comprising the first subset of data sources associated with the particular tag, without displaying the second subset of data sources not associated with the particular tag;

responsive to receiving a user selection of a first data source of the first subset of data sources from the first list: configuring the first instance of the first interface widget such that the candidate set of values to be accepted by the first instance of the first interface widget comprises a first set of values specified by the first data source;

responsive to a user request to display the form template in a second layout associated with a second set of dimensions:

displaying the form template, in the second layout associated with the second set of dimensions, in the form-design section;

wherein the form-design section is configured to receive a second drag-and-drop user input to place a second interface widget, of the available interface widgets, at a second location in the form template in the second layout;

rearranging, based on the second layout, a set of one or more instances of interface widgets displayed in the form template in the first layout, wherein the set of instances of interface widgets comprises the first instance of the first interface widget; and displaying the first instance of the first interface widget at a third location in the form template in the second layout.

8. The one or more media of claim 7, further storing instructions comprising:

responsive at least to receiving a second drag-and-drop user input to place the first interface widget, of the available interface widgets, at a fourth location in the form template in the first layout:

displaying a second instance of the first interface widget at the fourth location in the form template in the first layout;

identifying the particular memory location storing the candidate set of data sources;

determining that a third subset of the candidate set of data sources are associated with a second tag;

displaying a second list comprising the third subset of data sources associated with the second tag, without displaying data sources not associated with the second tag; and responsive to receiving a user selection of a second data source of the third subset of data sources from the second list: configuring the second instance of the first interface widget such that a second candidate set of values to be accepted by the second instance of the first interface widget comprises a second set of values specified by the second data source.

9. The one or more media of claim 7, wherein the particular memory location is the address corresponding to the particular electronic folder.

10. The one or more media of claim 7, wherein the particular memory location is the address corresponding to the particular machine or server.

11. The one or more media of claim 7, wherein the particular memory location is the address corresponding to the particular disk sector of the machine.

12. The one or more media of claim 7, further storing the instructions which cause:

displaying the particular form;

displaying the first instance of the first interface widget and a second instance of a second interface widget on the particular form;

responsive to determining that the first instance of the first interface widget is associated with the first data source: displaying a first limited set of selectable values for the first instance of the first interface widget, wherein the first limited set of selectable values is specified by the first data source;

responsive to determining that the second instance of the second interface widget is not associated with any existing data source: displaying a default set of selectable values for the second instance of the second interface widget.

13. One or more non-transitory machine-readable media storing instructions which, when executed by one or more processors, cause:

concurrently displaying, on a graphical user interface (GUI), at least a widget-selection section and a form-design section;

displaying available interface widgets in the widget-selection section;

responsive at least to receiving a first user input dragging a first interface widget, of the available interface widgets, from the widget-selection section to the form-design section:

displaying a first instance of the first interface widget in the form-design section;

displaying a first plurality of destinations;

responsive at least to receiving a second user input selecting a first destination of the first plurality of destinations:

configuring the first instance of the first interface widget to store a first data submission at the selected first destination, wherein the first data submission is made through the first instance of the first interface widget;

responsive at least to receiving a third user input dragging the first interface widget, of the available interface widgets, from the widget-selection section to the form-design section:

displaying a second instance of the first interface widget in the form-design section;

displaying the first plurality of destinations;

responsive at least to not receiving any user input selecting any destination of the first plurality of destinations:

configuring the second instance of the first interface widget to store a second data submission at a default destination, wherein the second data submission is made through the second instance of the first interface widget.

14. The one or more media of claim 13, further storing instructions comprising:

receiving the first data submission through the first instance of the first interface widget;

receiving the second data submission through the second instance of the second interface widget;

storing the first data submission at the first destination; and storing the second data submission at the default destination.

15. The one or more media of claim 13, further storing instructions comprising:

displaying a list associated with the first instance of the first interface widget, wherein the list comprises a plurality of existing data sources;

responsive to not receiving any user input selecting any of the plurality of existing data sources:

configuring the first instance of the first interface widget for accepting a value from a set of values specified by a default existing data source.

16. The one or more media of claim 13, further storing instructions comprising:

displaying a list associated with the first instance of the first interface widget, wherein the list comprises a plurality of existing data sources;

responsive to not receiving any user input selecting any of the plurality of existing data sources:

configuring the first instance of the first interface widget for accepting a value from a default set of values.

17. The one or more media of claim 13, further storing instructions comprising:

displaying a list associated with the second instance of the first interface widget, wherein the list comprises a plurality of existing data sources;

responsive to not receiving any user input selecting any of the plurality of existing data sources:

configuring the second instance of the first interface widget for accepting a value from a default set of values.

18. The one or more media of claim 13, further storing instructions which cause:

displaying a button indicating use of the default destination;

wherein configuring the second instance of the first interface widget to store the second data submission at the default destination is further responsive to a fourth user input selecting the button.

19. The one or more media of claim 13, further storing instructions which cause:

identifying a particular memory location storing a candidate set of destinations;

determining that a first subset of the candidate set of destinations are associated with a particular tag, wherein a second subset of the candidate set of destinations are not associated with the particular tag;

wherein the first subset of the candidate set of destinations that are associated with the particular tag includes two or more databases, records, logs, tables, or lists;

wherein the first plurality of destinations comprises the first subset of the candidate set of destinations associated with the particular tag, and does not comprise the second subset of the candidate set of destinations not associated with the particular tag.

20. The one or more media of claim 19, wherein determining that the first subset of the candidate set of destinations are associated with the particular tag comprises:

searching through the particular memory location to identify the first subset of the candidate set of destinations as being associated with the particular tag.

21. The one or more media of claim 20, wherein the particular memory location is an address corresponding to at least one of: a particular electronic folder, a particular machine or server, or a particular disk sector of a machine.

* * * * *